(12) United States Patent
Tremblay et al.

(10) Patent No.: US 6,718,457 B2
(45) Date of Patent: *Apr. 6, 2004

(54) MULTIPLE-THREAD PROCESSOR FOR THREADED SOFTWARE APPLICATIONS

(75) Inventors: Marc Tremblay, Menlo Park, CA (US); William Joy, Aspen, CO (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 103 days.

(21) Appl. No.: 09/204,480

(22) Filed: Dec. 3, 1998

(65) Prior Publication Data

US 2001/0042188 A1 Nov. 15, 2001

(51) Int. Cl.⁷ .................................................. G06F 9/30
(52) U.S. Cl. ........................................................ 712/212
(58) Field of Search ..................... 712/212, 23

(56) References Cited

U.S. PATENT DOCUMENTS

| | | | | |
|---|---|---|---|---|
| 5,197,130 A | * | 3/1993 | Chen et al. .................... 712/3 |
| 5,574,939 A | * | 11/1996 | Keckler et al. ................ 712/24 |
| 5,657,291 A | | 8/1997 | Podlesny et al. ......... 365/230.5 |
| 5,689,674 A | * | 11/1997 | Griffith et al. ............... 712/217 |
| 5,721,868 A | | 2/1998 | Yung et al. .................. 711/149 |
| 5,742,782 A | * | 4/1998 | Ito et al. ..................... 712/210 |
| 5,761,475 A | | 6/1998 | Yung et al. ................. 712/218 |
| 5,764,943 A | | 6/1998 | Wechsler ..................... 712/218 |
| 5,778,243 A | * | 7/1998 | Aipperspach et al. ......... 712/11 |
| 5,778,248 A | | 7/1998 | Leung .......................... 712/23 |
| 5,872,963 A | * | 2/1999 | Bitar et al. .................. 712/233 |
| 5,925,123 A | * | 7/1999 | Tremblay .................... 712/212 |
| 5,974,538 A | * | 10/1999 | Wilmot et al. ............... 712/218 |
| 6,092,175 A | * | 7/2000 | Levy et al. .................... 712/23 |
| 6,212,544 B1 | * | 4/2001 | Borkenhagen et al. ....... 709/103 |

OTHER PUBLICATIONS

David B. Fite, Designing a Vax for High Performance, 1990 IEEE.*

M. Fillo et al.: "The M–Machine Multicomputer;" Proceedings of the Annual International Symposium on Microarchitecture, U.S., Los Alamitos, IEEE Comp. Soc. Press, vol. SYMP. 28, 1995, pp. 146–156, XP000585356 ISBN: 0–8186–7349–4.

M. Berekovic et al.: "Hardware Realization of a Java Virtual Machine For High Performance Multimedia Applications;" 1997 IEEE Workshop on Signal Processing Systems. SIPS 97 Design and Implementation Formerly VLSI Signal Processing, pp. 479–488, XP002139288, 1997, New York, NY, USA, IEEE, USA ISBN: 0–7803–3806–5.

S. W. Keckler et al.: "Processor Coupling: Integrating Compile Time and Runtime Scheduling for Parallelism;" Proceedings of the Annual International Symposium on Computer Architecture, U.S., New York, IEEE, vol. SYMP. 19, 1992, pp. 202–213, XP000325804 ISBN: 0–89791–510–6.

* cited by examiner

Primary Examiner—David Y. Eng
(74) Attorney, Agent, or Firm—Zagorin, O'Brien & Graham LLP

(57) ABSTRACT

A processor has an improved architecture for multiple-thread operation on the basis of a highly parallel structure including multiple independent parallel execution paths for executing in parallel across threads and a multiple-instruction parallel pathway within a thread. The multiple independent parallel execution paths include functional units that execute an instruction set including special data-handling instructions that are advantageous in a multiple-thread environment.

35 Claims, 7 Drawing Sheets

MULTIPLE-THREAD PROCESSOR FOR THREADED SOFTWARE APPLICATIONS

The present invention is related to subject matter disclosed in the following co-pending patent applications:

1. U.S. Pat. No. 6,615,338, issued Sep. 2, 2003, entitled, "Clustered Architecture in a A VLIW Processor", naming Marc Tremblay and William Joy as inventors and filed on even date herewith;
2. U.S. Pat. No. 6,343,348, issued Jan. 29, 2002, entitled, "Apparatus and Method for Optimizing Die Utilization and Speed Performance by Register File Splitting", naming Marc Tremblay and William Joy as inventors and filed on even date herewith;
3. U.S. patent application Ser. No. 09/204,536 entitled, "Variable Issue-Width VLIW Processor", naming Marc Tremblay as inventor and filed on even date herewith;
4. U.S. Pat. No. 6,205,543, issued Mar. 20, 2001, entitled, "Efficient Handling of a Large Register File for Context Switching", naming Marc Tremblay and William Joy as inventors and filed on even date herewith;
5. U.S. Pat. No. 6,321,315, issued Nov. 20, 2001, entitled, "Dual In-line Buffers for an Instruction Fetch Unit", naming Marc Tremblay and Graham Murphy as inventors and filed on even date herewith;
6. U.S. Pat. No. 6,249,861, issued Jun. 19, 2001, entitled, "An Instruction Fetch Unit Aligner for a Non-Power of Two Size VLIW Instruction", naming Marc Tremblay and Graham Murphy as inventors and filed on even date herewith; and U.S. patent application Ser. No. 09/872,061 filed May 31, 2001 entitled "An Instruction Fetch Unit Aligner", naming Marc Tremblay and Graham Murphy as inventors.
7. U.S. Pat. No. 6,279,100, issued Aug. 21, 2001, entitled, "Local Stall Control Method and Structure in a Microprocessor", naming Marc Tremblay and Sharada Yeluri as inventors and filed on even date herewith;
8. U.S. patent application Ser. No. 09/204,585 entitled, "Local and Global Register Partitioning in a VLIW Processor", naming Marc Tremblay and William Joy as inventors and filed on even date herewith; and
9. U.S. patent application Ser. No. 09/204,479 entitled, "Implicitly Derived Register Specifiers in a Processor", naming Marc Tremblay and William Joy as inventors and filed on even date herewith.

BACKGROUND OF THE INVENTION

1. Field of the Invention

The present invention relates to a processor architecture. More specifically, the present invention relates to a single-chip processor architecture including structures for multiple-thread operation.

2. Description of the Related Art

For various processing applications, an automated system may handle multiple events or processes concurrently. A single process is termed a thread of control, or "thread", and is the basic unit of operation of independent dynamic action within the system. A program has at least one thread. A system performing concurrent operations typically has many threads, some of which are transitory and others enduring. Systems that execute among multiple processors allow for true concurrent threads. Single-processor systems can only have illusory concurrent threads, typically attained by time-slicing of processor execution, shared among a plurality of threads.

Some programming languages are particularly designed to support multiple-threading. One such language is the Java™ programming language that is advantageously executed using an abstract computing machine, the Java Virtual Machine™. A Java Virtual Machine™ is capable of supporting multiple threads of execution at one time. The multiple threads independently execute Java code that operates on Java values and objects residing in a shared main memory. The multiple threads may be supported using multiple hardware processors, by time-slicing a single hardware processor, or by time-slicing many hardware processors. In 1990 programmers at Sun Microsystems developed a universal programming language, eventually known as "the Java™ programming language". Java™, Sun, Sun Microsystems and the Sun Logo are trademarks or registered trademarks of Sun Microsystems, Inc. in the United States and other countries. All SPARC trademarks, including UltraSPARC I and UltraSPARC II, are used under license and are trademarks of SPARC International, Inc. in the United States and other countries. Products bearing SPARC trademarks are based upon an architecture developed by Sun Microsystems, Inc.

Java™ supports the coding of programs that, though concurrent, exhibit deterministic behavior, by including techniques and structures for synchronizing the concurrent activity of threads. To synchronize threads, Java™ uses monitors, high-level constructs that allow only a single thread at one time to execute a region of code protected by the monitor. Monitors use locks associated with executable objects to control thread execution.

A thread executes code by performing a sequence of actions. A thread may use the value of a variable or assign the variable a new value. If two or more concurrent threads act on a shared variable, the actions on the variable may produce a timing-dependent result, an inherent consequence of concurrent programming.

Each thread has a working memory that may store copies of the values of master copies of variables from main memory that are shared among all threads. A thread usually accesses a shared variable by obtaining a lock and flushing the working memory of the thread, guaranteeing that shared values are thereafter loaded from the shared memory to the working memory of the thread. By unlocking a lock, a thread guarantees that the values held by the thread in the working memory are written back to the main memory.

Several rules of execution order constrain the order in which certain events may occur. For example, actions performed by one thread are totally ordered so that for any two actions performed by a thread, one action precedes the other. Actions performed by the main memory for any one variable are totally ordered so that for any two actions performed by the main memory on the same variable, one action precedes the other. Actions performed by the main memory for any one lock are totally ordered so that for any two actions performed by the main memory on the same lock, one action precedes the other. Also, an action is not permitted to follow itself. Threads do not interact directly but rather only communicate through the shared main memory.

The relationships among the actions of a thread and the actions of main memory are also constrained by rules. For example, each lock or unlock is performed jointly by some thread and the main memory. Each load action by a thread is uniquely paired with a read action by the main memory such that the load action follows the read action. Each store action by a thread is uniquely paired with a write action by the main memory such that the write action follows the store action.

An implementation of threading incurs some overhead. For example, a single processor system incurs overhead in time-slicing between threads. Additional overhead is incurred in allocating and handling accessing of main memory and local thread working memory.

What is needed is a processor architecture that supports multiple-thread operation and reduces the overhead associated with multiple-thread operation.

SUMMARY OF THE INVENTION

A processor has an improved architecture for multiple-thread operation on the basis of a highly parallel structure including multiple independent parallel execution paths for executing in parallel across threads and a multiple-instruction parallel pathway within a thread. The multiple independent parallel execution paths include functional units that execute an instruction set including special data-handling instructions that are advantageous in a multiple-thread environment.

In accordance with one embodiment of the present invention, a general-purpose processor includes two independent processor elements in a single integrated circuit die. The dual independent processor elements advantageously execute two independent threads concurrently during multiple-threading operation. When only a single thread is executed on a first of the two processor elements, the second processor element is advantageously used to perform garbage collection, Just-In-Time (JIT) compilation, and the like. Illustratively, the independent processor elements are Very Long Instruction Word (VLIW) processors. For example, one illustrative processor includes two independent Very Long Instruction Word (VLIW) processor elements, each of which executes an instruction group or instruction packet that includes up to four instructions, otherwise termed subinstructions. Each of the instructions in an instruction group executes on a separate functional unit.

The two threads execute independently on the respective VLIW processor elements, each of which includes a plurality of powerful functional units that execute in parallel. In the illustrative embodiment, the VLIW processor elements have four functional units including three media functional units and one general functional unit. All of the illustrative media functional units include an instruction that executes both a multiply and an add in a single cycle, either floating point or fixed point.

In accordance with an aspect of the present invention, an individual independent parallel execution path has operational units including instruction supply blocks and instruction preparation blocks, functional units, and a register file that are separate and independent from the operational units of other paths of the multiple independent parallel execution paths. The instruction supply blocks include a separate instruction cache for the individual independent parallel execution paths, however the multiple independent parallel execution paths share a single data cache since multiple threads sometimes share data. The data cache is dual-ported, allowing data access in both execution paths in a single cycle.

In addition to the instruction cache, the instruction supply blocks in an execution path include an instruction aligner, and an instruction buffer that precisely format and align the full instruction group to prepare to access the register file. An individual execution path has a single register file that is physically split into multiple register file segments, each of which is associated with a particular functional unit of the multiple functional units. At any point in time, the register file segments as allocated to each functional unit each contain the same content. A multi-ported register file is typically metal limited to the area consumed by the circuit proportional with the square of the number of ports. It has been discovered that a processor having a register file structure divided into a plurality of separate and independent register files forms a layout structure with an improved layout efficiency. The read ports of the total register file structure are allocated among the separate and individual register files. Each of the separate and individual register files has write ports that correspond to the total number of write ports in the total register file structure. Writes are fully broadcast so that all of the separate and individual register files are coherent.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

The use of the same reference symbols in different drawings indicates similar or identical items.

Section A, which appears at the end of this specification, provides a detailed description of an exemplary instruction set suitable for use in a processor architecture such as illustrated in the above referenced drawings and described elsewhere herein.

DESCRIPTION OF THE EMBODIMENT(S)

Figure 1:
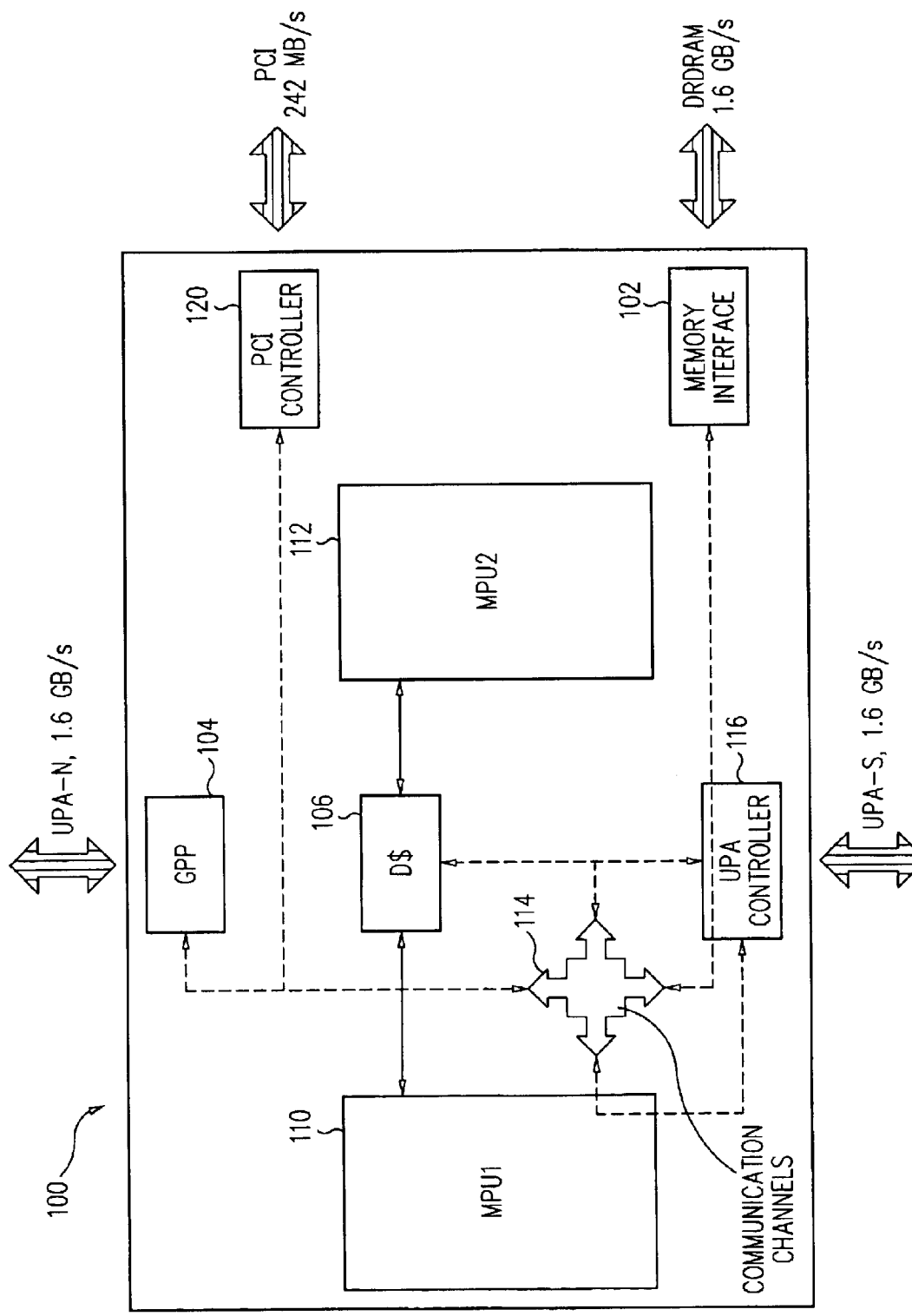
FIG. 1 is a schematic block diagram illustrating a single integrated circuit chip implementation of a processor in accordance with an embodiment of the present invention.

Referring to FIG. 1, a schematic block diagram illustrates a processor 100 having an improved architecture for multiple-thread operation on the basis of a highly parallel structure including multiple independent parallel execution paths, shown herein as two media processing units 110 and 112. The execution paths execute in parallel across threads and include a multiple-instruction parallel pathway within a thread. The multiple independent parallel execution paths include functional units executing an instruction set having special data-handling instructions that are advantageous in a multiple-thread environment.

The multiple-threading architecture of the processor 100 is advantageous for usage in executing multiple-threaded applications using a language such as the Java™ language running under a multiple-threaded operating system on a multiple-threaded Java Virtual Machine™. The illustrative processor 100 includes two independent processor elements, the media processing units 110 and 112, forming two independent parallel execution paths. A language that supports multiple threads, such as the Java™ programming language generates two threads that respectively execute in the two parallel execution paths with very little overhead incurred. The special instructions executed by the multiple-threaded processor include instructions for accessing arrays, and instructions that support garbage collection.

A single integrated circuit chip implementation of a processor 100 includes a memory interface 102, a geometry decompressor 104, the two media processing units 110 and 112, a shared data cache 106, and several interface controllers. The interface controllers support an interactive graphics environment with real-time constraints by integrating fundamental components of memory, graphics, and input/output bridge functionality on a single die. The components are mutually linked and closely linked to the processor core with high bandwidth, low-latency communication channels 114 to manage multiple high-bandwidth data streams efficiently and with a low response time. The interface controllers include an UltraPort Architecture Interconnect (UPA) controller 116 and a peripheral component interconnect (PCI) controller 120. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The UPA controller 116 is a custom interface that attains a suitable balance between high-performance computational and graphic subsystems. The UPA is a cache-coherent, processor-memory interconnect. The UPA attains several advantageous characteristics including a scaleable bandwidth through support of multiple bused interconnects for data and addresses, packets that are switched for improved bus utilization, higher bandwidth, and precise interrupt processing. The UPA performs low latency memory accesses with high throughput paths to memory. The UPA includes a buffered cross-bar memory interface for increased bandwidth and improved scaleability. The UPA supports high-performance graphics with two-cycle single-word writes on the 64-bit UPA interconnect. The UPA interconnect architecture utilizes point-to-point packet switched messages from a centralized system controller to maintain cache coherence. Packet switching improves bus bandwidth utilization by removing the latencies commonly associated with transaction-based designs.

The PCI controller 120 is used as the primary system I/O interface for connecting standard, high-volume, low-cost peripheral devices, although other standard interfaces may also be used. The PCI bus effectively transfers data among high bandwidth peripherals and low bandwidth peripherals, such as CD-ROM players, DVD players, and digital cameras.

Two media processing units 110 and 112 are included in a single integrated circuit chip to support an execution environment exploiting thread level parallelism in which two independent threads can execute simultaneously. The threads may arise from any sources such as the same application, different applications, the operating system, or the runtime environment. Parallelism is exploited at the thread level since parallelism is rare beyond four, or even two, instructions per cycle in general purpose code. For example, the illustrative processor 100 is an eight-wide machine with eight execution units for executing instructions. A typical "general-purpose" processing code has an instruction level parallelism of about two so that, on average, most (about six) of the eight execution units would be idle at any time. The illustrative processor 100 employs thread level parallelism and operates on two independent threads, possibly attaining twice the performance of a processor having the same resources and clock rate but utilizing traditional non-thread parallelism.

Thread level parallelism is particularly useful for Java™ applications, which are bound to have multiple threads of execution. Java™ methods including "suspend", "resume", "sleep", and the like include effective support for threaded program code. In addition, Java™ class libraries are thread-safe to promote parallelism. Furthermore, the thread model of the processor 100 supports a dynamic compiler which runs as a separate thread using one media processing unit 110 while the second media processing unit 112 is used by the current application. In the illustrative system, the compiler applies optimizations based on "on-the-fly" profile feedback information while dynamically modifying the executing code to improve execution on each subsequent run. For example, a "garbage collector" may be executed on a first media processing unit 110, copying objects or gathering pointer information, while the application is executing on the other media processing unit 112.

Although the processor 100 shown in FIG. 1 includes two processing units on an integrated circuit chip, the architecture is highly scaleable so that one to several closely-coupled processors may be formed in a message-based coherent architecture and resident on the same die to process multiple threads of execution. Thus, in the processor 100, a limitation on the number of processors formed on a single die thus arises from capacity constraints of integrated circuit technology rather than from architectural constraints relating to the interactions and interconnections between processors.

The processor 100 is a general-purpose processor that includes the media processing units 110 and 112, two independent processor elements in a single integrated circuit die. The dual independent processor elements 110 and 112 advantageously execute two independent threads concurrently during multiple-threading operation. When only a single thread executes on the processor 100, one of the two processor elements executes the thread, the second processor element is advantageously used to perform garbage collection, Just-In-Time (JIT) compilation, and the like. In the illustrative processor 100, the independent processor elements 110 and 112 are Very Long Instruction Word (VLIW) processors. For example, one illustrative processor 100 includes two independent Very Long Instruction Word (VLIW) processor elements, each of which executes an instruction group or instruction packet that includes up to four instructions. Each of the instructions in an instruction group executes on a separate functional unit.

The usage of a VLIW processor advantageously reduces complexity by avoiding usage of various structures such as schedulers or reorder buffers that are used in superscalar machines to handle data dependencies. A VLIW processor typically uses software scheduling and software checking to avoid data conflicts and dependencies, greatly simplifying hardware control circuits.

The two threads execute independently on the respective VLIW processor elements 110 and 112, each of, which includes a plurality of powerful functional units that execute in parallel. In the illustrative embodiment shown in FIG. 2, the VLIW processor elements 110 and 112 have four functional units including three media functional units 220 and one general functional unit 222. All of the illustrative media functional units 220 include an instruction that executes both a multiply and an add in a single cycle, either floating point or fixed point. Thus, a processor with two VLIW processor elements can execute twelve floating point operations each cycle. At a 500 MHz execution rate, for example, the processor runs at an 6 gigaflop rate, even without accounting for general functional unit operation.

Figure 2:
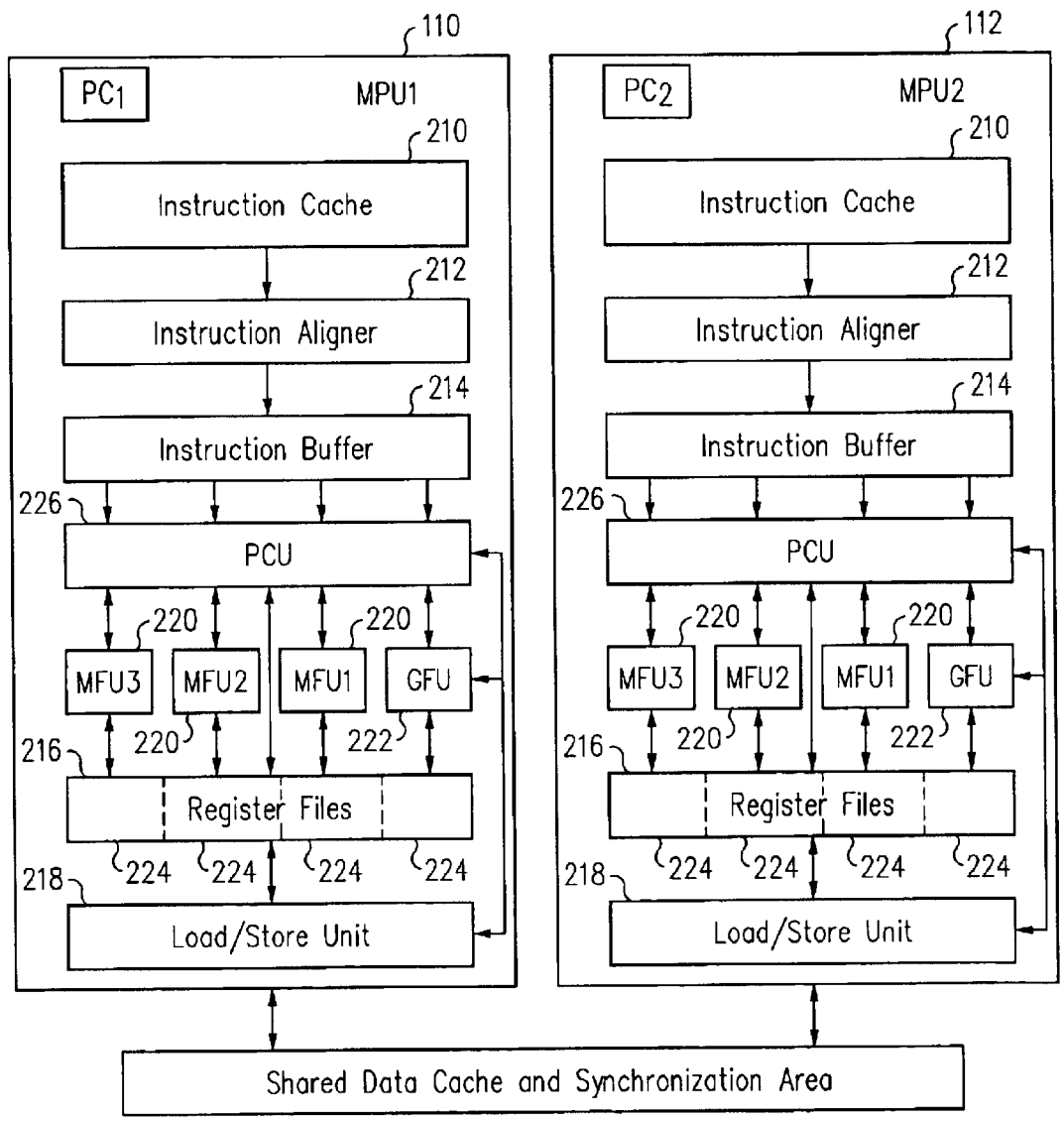
FIG. 2 is a schematic block diagram showing the core of the processor.

Referring to FIG. 2, a schematic block diagram shows the core of the processor 100. The media processing units 110 and 112 each include an instruction cache 210, an instruction aligner 212, an instruction buffer 214, a pipeline control unit 226, a split register file 216, a plurality of execution units, and a load/store unit 218. In the illustrative processor 100, the media processing units 110 and 112 use a plurality of execution units for executing instructions. The execution units for a media processing unit 110 include three media functional units (MFU) 220 and one general functional unit (GFU) 222.

An individual independent parallel execution path 110 or 112 has operational units including instruction supply blocks and instruction preparation blocks, functional units 220 and 222, and a register file 216 that are separate and independent from the operational units of other paths of the multiple independent parallel execution paths. The instruction supply blocks include a separate instruction cache 210 for the individual independent parallel execution paths, however the multiple independent parallel execution paths share a single data cache 106 since multiple threads sometimes share data. The data cache 106 is dual-ported, allowing data access in both execution paths 110 and 112 in a single cycle. Sharing of the data cache 106 among independent processor elements 110 and 112 advantageously simplifies data handling, avoiding a need for a cache coordination protocol and the overhead incurred in controlling the protocol.

In addition to the instruction cache 210, the instruction supply blocks in an execution path include the instruction aligner 212, and the instruction buffer 214 that precisely format and align a full instruction group of four instructions to prepare to access the register file 216. An individual execution path has a single register file 216 that is physically split into multiple register file segments, each of which is associated with a particular functional unit of the multiple functional units. At any point in time, the register file segments as allocated to each functional unit each contain the same content. A multi-ported register file is typically metal limited to the area consumed by the circuit proportional with the square of the number of ports. The processor 100 has a register file structure divided into a plurality of separate and independent register files to form a layout structure with an improved layout efficiency. The read ports of the total register file structure 216 are allocated among the separate and individual register files. Each of the separate and individual register files has write ports that correspond to the total number of write ports in the total register file structure. Writes are fully broadcast so that all of the separate and individual register files are coherent.

The media functional units 220 are multiple single-instruction-multiple-datapath (MSIMD) media functional units. Each of the media functional units 220 is capable of processing parallel 16-bit components. Various parallel 16-bit operations supply the single-instruction-multiple-datapath capability for the processor 100 including add, multiply-add, shift, compare, and the like. The media functional units 220 operate in combination as tightly coupled digital signal processors (DSPs). Each media functional unit 220 has an separate and individual sub-instruction stream, but all three media functional units 220 execute synchronously so that the subinstructions progress lock-step through pipeline stages.

The general functional unit 222 is a RISC processor capable of executing arithmetic logic unit (ALU) operations, loads and stores, branches, and various specialized and esoteric functions such as parallel power operations, reciprocal square root operations, and many others. The general functional unit 222 supports less common parallel operations such as the parallel reciprocal square root instruction.

The illustrative instruction cache 210 is two-way set-associative, has a 16 Kbyte capacity, and includes hardware support to maintain coherence, allowing dynamic optimizations through self-modifying code. Software is used to indicate that the instruction storage is being modified when modifications occur. The 16K capacity is suitable for performing graphic loops, other multimedia tasks or processes, and general-purpose Java™ code. Coherency is maintained by hardware that supports write-through, non-allocating caching. Self-modifying code is supported through explicit use of "store-to-instruction-space" instruction store2i. Software uses the store2i instruction to maintain coherency with the instruction cache 210 so that the instruction caches 210 do not have to be snooped on every single store operation issued by the media processing unit 110.

The pipeline control unit 226 is connected between the instruction buffer 214 and the functional units and schedules the transfer of instructions to the functional units. The pipeline control unit 226 also receives status signals from the functional units and the load/store unit 218 and uses the status signals to perform several control functions. The pipeline control unit 226 maintains a scoreboard, generates stalls and bypass controls. The pipeline control unit 226 also generates traps and maintains special registers.

Each media processing unit 110 and 112 includes a split register file 216, a single logical register file including 128 thirty-two bit registers. The split register file 216 is split into a plurality of register file segments 224 to form a multi-ported structure that is replicated to reduce the integrated circuit die area and to reduce access time. A separate register file segment 224 is allocated to each of the media functional units 220 and the general functional unit 222. In the illustrative embodiment, each register file segment 224 has 128 32-bit registers. The first 96 registers (0–95) in the register file segment 224 are global registers. All functional units can write to the 96 global registers. The global registers are coherent across all functional units (MFU and GFU) so that any write operation to a global register by any functional unit is broadcast to all register file segments 224. Registers 96–127 in the register file segments 224 are local registers. Local registers allocated to a functional unit are not accessible or "visible" to other functional units.

The media processing units 110 and 112 are highly structured computation blocks that execute software-scheduled data computation operations with fixed, deterministic and relatively short instruction latencies, operational characteristics yielding simplification in both function and cycle time. The operational characteristics support multiple instruction issue through a pragmatic very large instruction word (VLIW) approach that avoids hardware interlocks to account for software that does not schedule operations properly. Such hardware interlocks are typically complex, error-prone, and create multiple critical paths. A VLIW instruction word always includes one instruction that executes in the general functional unit (GFU) 222 and from zero to three instructions that execute in the media functional units (MFU) 220. A MFU instruction field within the VLIW instruction word includes an operation code (opcode) field, three source register (or immediate) fields, and one destination register field.

Instructions are executed in-order in the processor 100 but loads can finish out-of-order with respect to other instructions and with respect to other loads, allowing loads to be moved up in the instruction stream so that data can be streamed from main memory. The execution model eliminates the usage and overhead resources of an instruction window, reservation stations, a re-order buffer, or other blocks for handling instruction ordering. Elimination of the instruction ordering structures and overhead resources is highly advantageous since the eliminated blocks typically consume a large portion of an integrated circuit die. For example, the eliminated blocks consume about 30% of the die area of a Pentium II processor.

To avoid software scheduling errors, the media processing units 110 and 112 are high-performance but simplified with respect to both compilation and execution. The media processing units 110 and 112 are most generally classified as a simple 2-scalar execution engine with full bypassing and hardware interlocks on load operations. The instructions include loads, stores, arithmetic and logic (ALU) instructions, and branch instructions so that scheduling for the processor 100 is essentially equivalent to scheduling for a simple 2-scalar execution engine for each of the two media processing units 110 and 112.

The processor 100 supports full bypasses between the first two execution units within the media processing unit 110 and 112 and has a scoreboard in the general functional unit 222 for load operations so that the compiler does not need to handle nondeterministic latencies due to cache misses. The processor 100 scoreboards long latency operations that are executed in the general functional unit 222, for example a reciprocal square-root operation, to simplify scheduling across execution units. The scoreboard (not shown) operates by tracking a record of an instruction packet or group from the time the instruction enters a functional unit until the instruction is finished and the result becomes available. A VLIW instruction packet contains one GFU instruction and from zero to three MFU instructions. The source and destination registers of all instructions in an incoming VLIW instruction packet are checked against the scoreboard. Any true dependencies or output dependencies stall the entire packet until the result is ready. Use of a scoreboarded result as an operand causes instruction issue to stall for a sufficient number of cycles to allow the result to become available. If the referencing instruction that provokes the stall executes on the general functional unit 222 or the first media functional unit 220, then the stall only endures until the result is available for intra-unit bypass. For the case of a load instruction that hits in the data cache 106, the stall may last only one cycle. If the referencing instruction is on the second or third media functional units 220, then the stall endures until the result reaches the writeback stage in the pipeline where the result is bypassed in transmission to the split register file 216.

The scoreboard automatically manages load delays that occur during a load hit. In an illustrative embodiment, all loads enter the scoreboard to simplify software scheduling and eliminate NOPs in the instruction stream.

The scoreboard is used to manage most interlock conditions between the general functional unit 222 and the media functional units 220. All loads and non-pipelined long-latency operations of the general functional unit 222 are scoreboarded. The long-latency operations include division idiv, fdiv instructions, reciprocal square root frecsqrt, precsqrt instructions, and power ppower instructions. None of the results of the media functional units 220 is scoreboarded. Non-scoreboarded results are available to subsequent operations on the functional unit that produces the results following the latency of the instruction.

The illustrative processor 100 has a rendering rate of over fifty million triangles per second without accounting for operating system overhead. Therefore, data feeding specifications of the processor 100 are far beyond the capabilities of cost-effective memory systems. Sufficient data bandwidth is achieved by rendering of compressed geometry using the geometry decompressor 104, an on-chip real-time geometry decompression engine. Data geometry is stored in main memory in a compressed format. At render time, the data geometry is fetched and decompressed in real-time on the integrated circuit of the processor 100. The geometry decompressor 104 advantageously saves memory space and memory transfer bandwidth. The compressed geometry uses an optimized generalized mesh structure that explicitly calls out most shared vertices between triangles, allowing the processor 100 to transform and light most vertices only once. In a typical compressed mesh, the triangle throughput of the transform-and-light stage is increased by a factor of four or more over the throughput for isolated triangles. For example, during processing of triangles, multiple vertices are operated upon in parallel so that the utilization rate of resources is high, achieving effective spatial software pipelining. Thus operations are overlapped in time by operating on several vertices simultaneously, rather than overlapping several loop iterations in time. For other types of applications with high instruction level parallelism, high trip count loops are software-pipelined so that most media functional units 220 are fully utilized.

Figure 3:
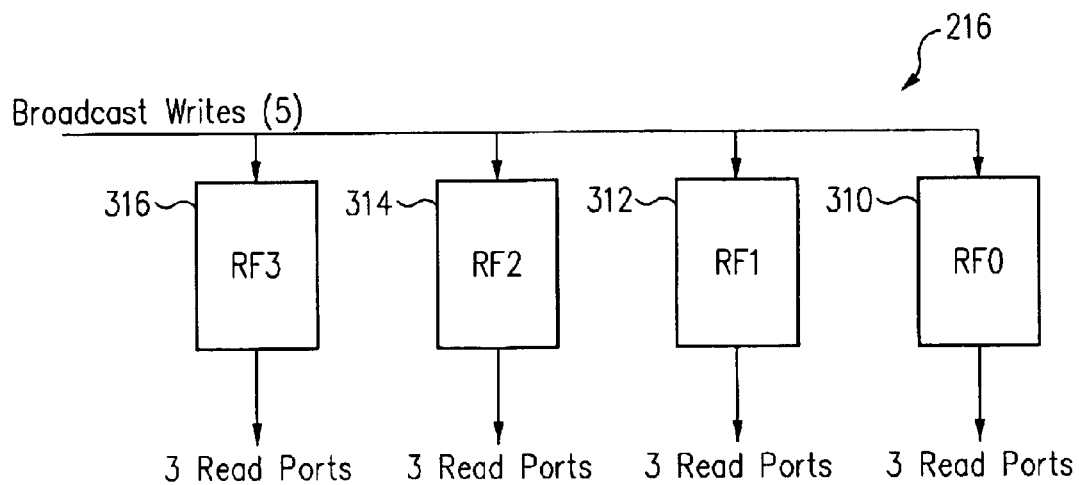
FIG. 3 is a schematic block diagram that illustrates an embodiment of the split register file that is suitable for usage in the processor.

Referring to FIG. 3, a schematic block diagram illustrates an embodiment of the split register file 216 that is suitable for usage in the processor 100. The split register file 216 supplies all operands of processor instructions that execute in the media functional units 220 and the general functional units 222 and receives results of the instruction execution from the execution units. The split register file 216 operates as an interface to the geometry decompressor 104. The split register file 216 is the source and destination of store and load operations, respectively.

In the illustrative processor 100, the split register file 216 in each of the media processing units 110 and 112 has 128 registers. Graphics processing places a heavy burden on register usage. Therefore, a large number of registers is supplied by the split register file 216 so that performance is not limited by loads and stores or handling of intermediate results including graphics "fills" and "spills". The illustrative split register file 216 includes twelve read ports and five write ports, supplying total data read and write capacity between the central registers of the split register file 216 and all media functional units 220 and the general functional unit 222. The five write ports include one 64-bit write port that is dedicated to load operations. The remaining four write ports are 32 bits wide and are used to write operations of the general functional unit 222 and the media functional units 220.

A large total read and write capacity promotes flexibility and facility in programming both of hand-coded routines and compiler-generated code.

Large, multiple-ported register files are typically metal-limited so that the register area is proportional with the square of the number of ports. A sixteen port file is roughly proportional in size and speed to a value of 256. The illustrative split register file 216 is divided into four register file segments 310, 312, 314, and 316, each having three read ports and four write ports so that each register file segment has a size and speed proportional to 49 for a total area for the four segments that is proportional to 196. The total area is therefore potentially smaller and faster than a single central register file. Write operations are fully broadcast so that all files are maintained coherent. Logically, the split register file 216 is no different from a single central register file. However, from the perspective of layout efficiency, the split register file 216 is highly advantageous, allowing for reduced size and improved performance.

The new media data that is operated upon by the processor 100 is typically heavily compressed. Data transfers are communicated in a compressed format from main memory and input/output devices to pins of the processor 100, subsequently decompressed on the integrated circuit holding the processor 100, and passed to the split register file 216.

Splitting the register file into multiple segments in the split register file 216 in combination with the character of data accesses in which multiple bytes are transferred to the plurality of execution units concurrently, results in a high utilization rate of the data supplied to the integrated circuit chip and effectively leads to a much higher data bandwidth than is supported on general-purpose processors. The highest data bandwidth requirement is therefore not between the input/output pins and the central processing units, but is rather between the decompressed data source and the remainder of the processor. For graphics processing, the highest data bandwidth requirement is between the geometry decompressor 104 and the split register file 216. For video decompression, the highest data bandwidth requirement is internal to the split register file 216. Data transfers between the geometry decompressor 104 and the split register file 216 and data transfers between various registers of the split register file 216 can be wide and run at processor speed, advantageously delivering a large bandwidth.

The register file 216 is a focal point for attaining the very large bandwidth of the processor 100. The processor 100 transfers data using a plurality of data transfer techniques. In one example of a data transfer technique, cacheable data is loaded into the split register file 216 through normal load operations at a low rate of up to eight bytes per cycle. In another example, streaming data is transferred to the split register file 216 through group load operations, which transfer thirty-two bytes from memory directly into eight consecutive 32-bit registers. The processor 100 utilizes the streaming data operation to receive compressed video data for decompression.

Compressed graphics data is received via a direct memory access (DMA) unit in the geometry decompressor 104. The compressed graphics data is decompressed by the geometry decompressor 104 and loaded at a high bandwidth rate into the split register file 216 via group load operations that are mapped to the geometry decompressor 104.

Load operations are non-blocking and scoreboarded so that early scheduling can hide a long latency inherent to loads.

General purpose applications often fail to exploit the large register file 216. Statistical analysis shows that compilers do not effectively use the large number of registers in the split register file 216. However, aggressive in-lining techniques that have traditionally been restricted due to the limited number of registers in conventional systems may be advantageously used in the processor 100 to exploit the large number of registers in the split register file 216. In a software system that exploits the large number of registers in the processor 100, the complete set of registers is saved upon the event of a thread (context) switch. When only a few registers of the entire set of registers is used, saving all registers in the full thread switch is wasteful. Waste is avoided in the processor 100 by supporting individual marking of registers. Octants of the thirty-two registers can be marked as "dirty" if used, and are consequently saved conditionally.

In various embodiments, dedicating fields for globals, trap registers, and the like leverages the split register file 216.

Figure 4:
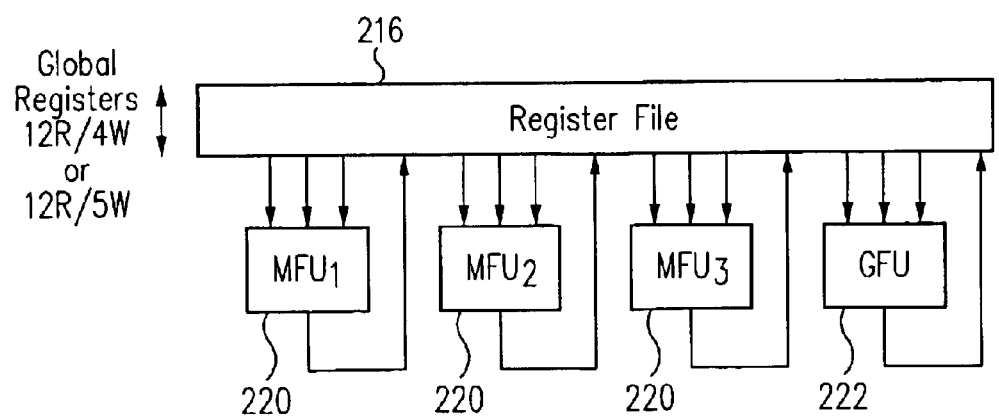
FIG. 4 is a schematic block diagram that shows a logical view of the register file and functional units in the processor.

Referring to FIG. 4, a schematic block diagram shows a logical view of the register file 216 and functional units in the processor 100. The physical implementation of the core processor 100 is simplified by replicating a single functional unit to form the three media functional units 220. The media functional units 220 include circuits that execute various arithmetic and logical operations including general-purpose code, graphics code, and video-image-speech (VIS) processing. VIS processing includes video processing, image processing, digital signal processing (DSP) loops, speech processing, and voice recognition algorithms, for example.

Figure 5:
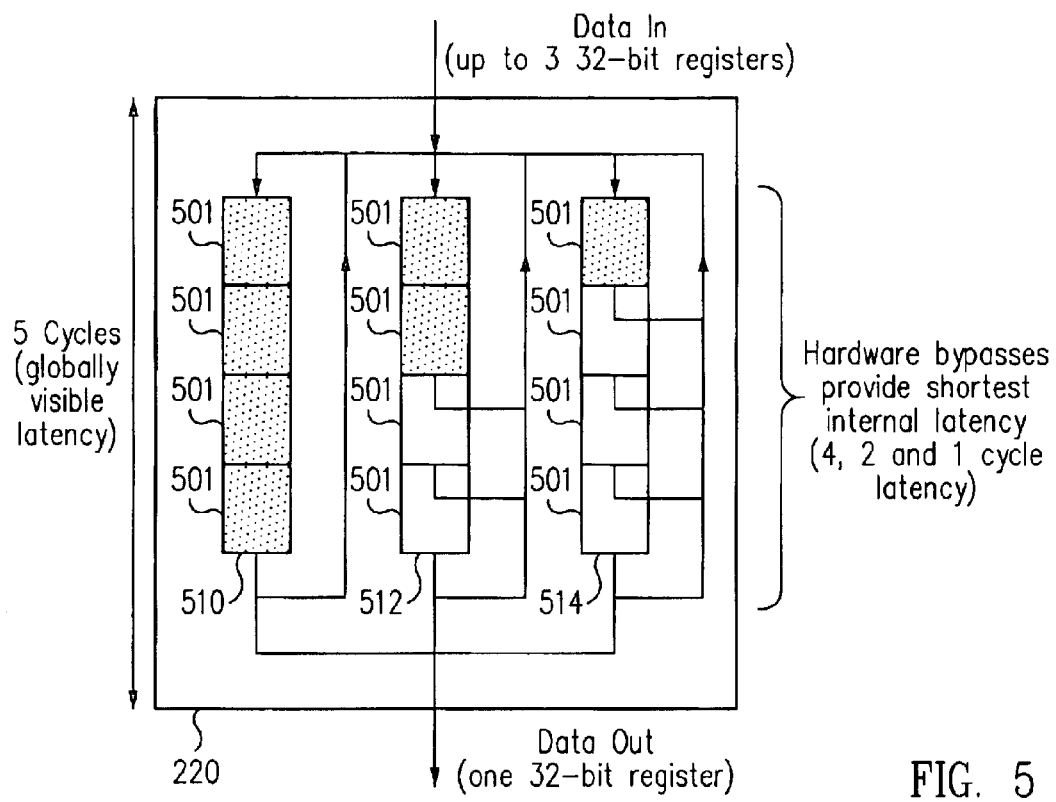
FIG. 5 is a pictorial schematic diagram depicting an example of instruction execution among a plurality of media functional units.

Referring to FIG. 5, a simplified pictorial schematic diagram depicts an example of instruction execution among a plurality of media functional units 220. Results generated by various internal function blocks 501 within a first individual media functional unit are immediately accessible internally to the first media functional unit 510 but are only accessible globally by other media functional units 512 and 514 and by the general functional unit five cycles after the instruction enters the first media functional unit 510, regardless of the actual latency of the instruction. Therefore, instructions executing within a functional unit can be scheduled by software to execute immediately, taking into consideration the actual latency of the instruction. In contrast, software that schedules instructions executing I different functional units is expected to account for the five cycle latency. In the diagram, the shaded areas represent the stage at which the pipeline completes execution of an instruction and generates final result values. A result is not available internal to a functional u nit a final shaded stage completes. In the example, media processing unit instructions have three different latencies—four cycles of instructions such as fmuladd and fadd, two cycles for instructions such as pmuladd, and one cycle for instructions like padd and xor.

Although internal bypass logic within a media functional unit 220 forwards results to execution units within the same media functional unit 220, the internal bypass logic does not detect incorrect attempts to reference a result before the result is available.

Software that schedules instructions for which a dependency occurs between a particular media functional unit, for example 512, and other media functional units 510 and 514, or between the particular media functional unit 512 and the general functional unit 222, is to account for the five cycle latency between entry of an instruction to the media functional unit 512 and the five cycle pipeline duration.

Figure 6:
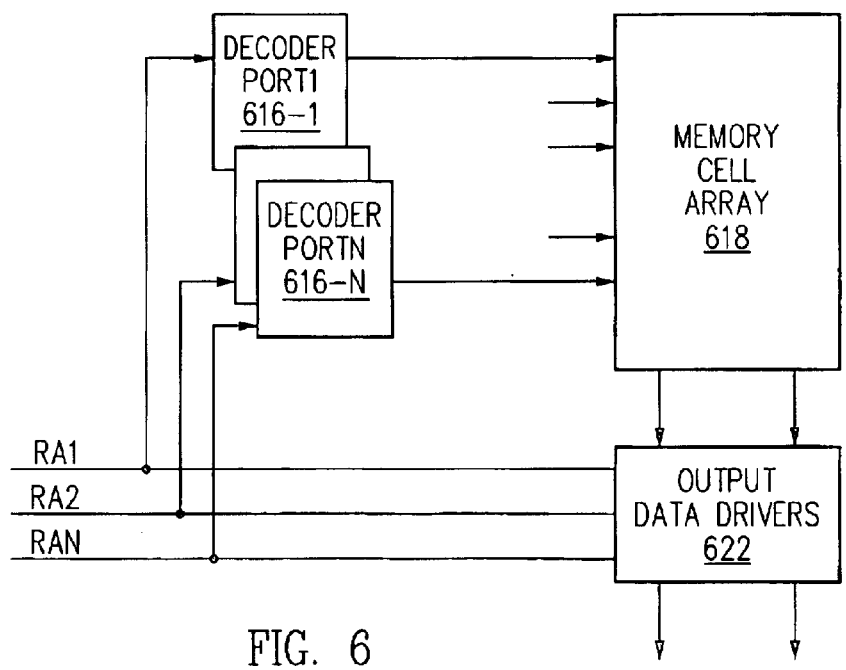
FIG. 6 illustrates a schematic block diagram of an SRAM array used for the multi-port split register file.

Referring to FIG. 6, a schematic block diagram depicts an embodiment of the multiport register file 216. A plurality of read address buses RA1 through RAN carry read addresses that are applied to decoder ports 616-1 through 616-N, respectively. Decoder circuits are well known to those of ordinary skill in the art, and any of several implementations could be used as the decoder ports 616-1 through 616-N. When an address is presented to any of decoder ports 616-1 through 616-N, the address is decoded and a read address signal is transmitted by a decoder port 616 to a register in a memory cell array 618. Data from the memory cell array 618 is output using output data drivers 622. Data is transferred to and from the memory cell array 618 under control of control signals carried on some of the lines of the buses of the plurality of read address buses RA1 through RAN.

Figure 7A:
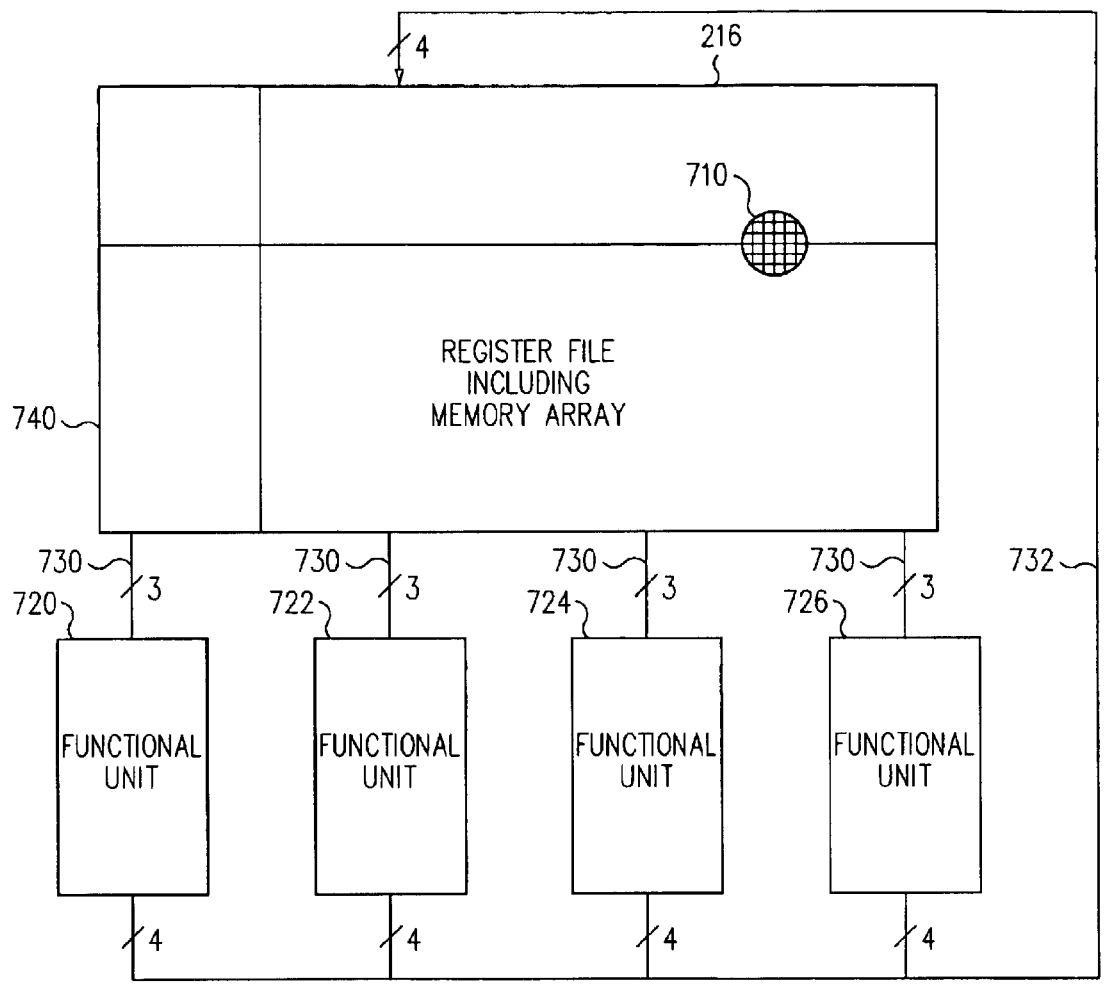
FIGS. 7A and 7B are, respectively, a schematic block diagram and a pictorial diagram that illustrate the register file and a memory array insert of the register file.
Figure 7B:
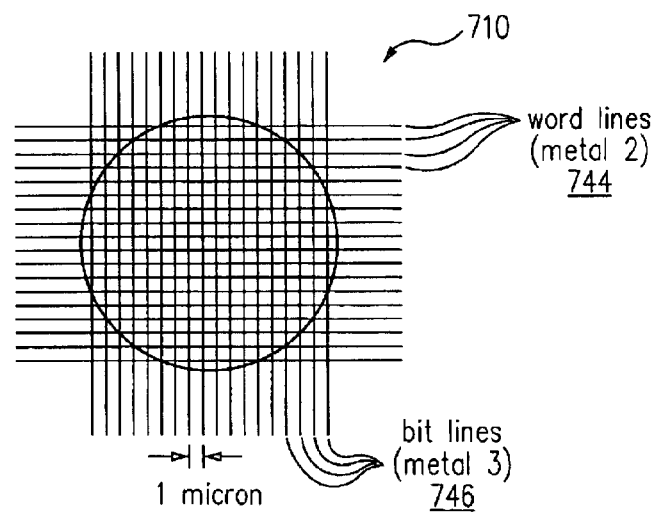

Referring to FIGS. 7A and 7B, a schematic block diagram and a pictorial diagram, respectively, illustrate the register file 216 and a memory array insert 710. The register file 216 is connected to a four functional units 720, 722, 724, and 726 that supply information for performing operations such as arithmetic, logical, graphics, data handling operations and the like. The illustrative register file 216 has twelve read ports 730 and four write ports 732. The twelve read ports 730 are illustratively allocated with three ports connected to each of the four functional units. The four write ports 732 are connected to receive data from all of the four functional units.

The register file 216 includes a decoder, as is shown in FIG. 6, for each of the sixteen read and write ports. The register file 216 includes a memory array 740 that is partially shown in the insert 710 illustrated in FIG. 7B and includes a plurality of word lines 744 and bit lines 746. The word lines 744 and bit lines 746 are simply a set of wires that connect transistors (not shown) within the memory array 740. The word lines 744 select registers so that a particular word line selects a register of the register file 216. The bit lines 746 are a second set of wires that connect the transistors in the memory array 740. Typically, the word lines 744 and bit lines 746 are laid out at right angles. In the illustrative embodiment, the word lines 744 and the bit lines 746 are constructed of metal laid out in different planes such as a metal 2 layer for the word lines 744 and a metal 3 layer for the bit lines 746. In other embodiments, bit lines and word lines may be constructed of other materials, such as polysilicon, or can reside at different levels than are described in the illustrative embodiment, that are known in the art of semiconductor manufacture. In the illustrative example, a distance of about 1 $\mu$m separates the word lines 744 and a distance of approximately 1 $\mu$m separates the bit lines 746. Other circuit dimensions may be constructed for various processes. The illustrative example shows one bit line per port, other embodiments may use multiple bit lines per port.

When a particular functional unit reads a particular register in the register file 216, the functional unit sends an address signal via the read ports 730 that activates the appropriate word lines to access the register. In a register file having a conventional structure and twelve read ports, each cell, each storing a single bit of information, is connected to twelve word lines to select an address and twelve bit lines to carry data read from the address.

The four write ports 732 address registers in the register file using four word lines 744 and four bit lines 746 connected to each cell. The four word lines 744 address a cell and the four bit lines 746 carry data to the cell.

Thus, if the illustrative register file 216 were laid out in a conventional manner with twelve read ports 730 and four write ports 732 for a total of sixteen ports and the ports were 1 $\mu$m apart, one memory cell would have an integrated circuit area of 256 $\mu$m (16×16). The area is proportional to the square of the number of ports.

The register file 216 is alternatively implemented to perform single-ended reads and/or single-ended writes utilizing a single bit line per port per cell, or implemented to perform differential reads and/or differential writes using two bit lines per port per cell.

Figure 8:
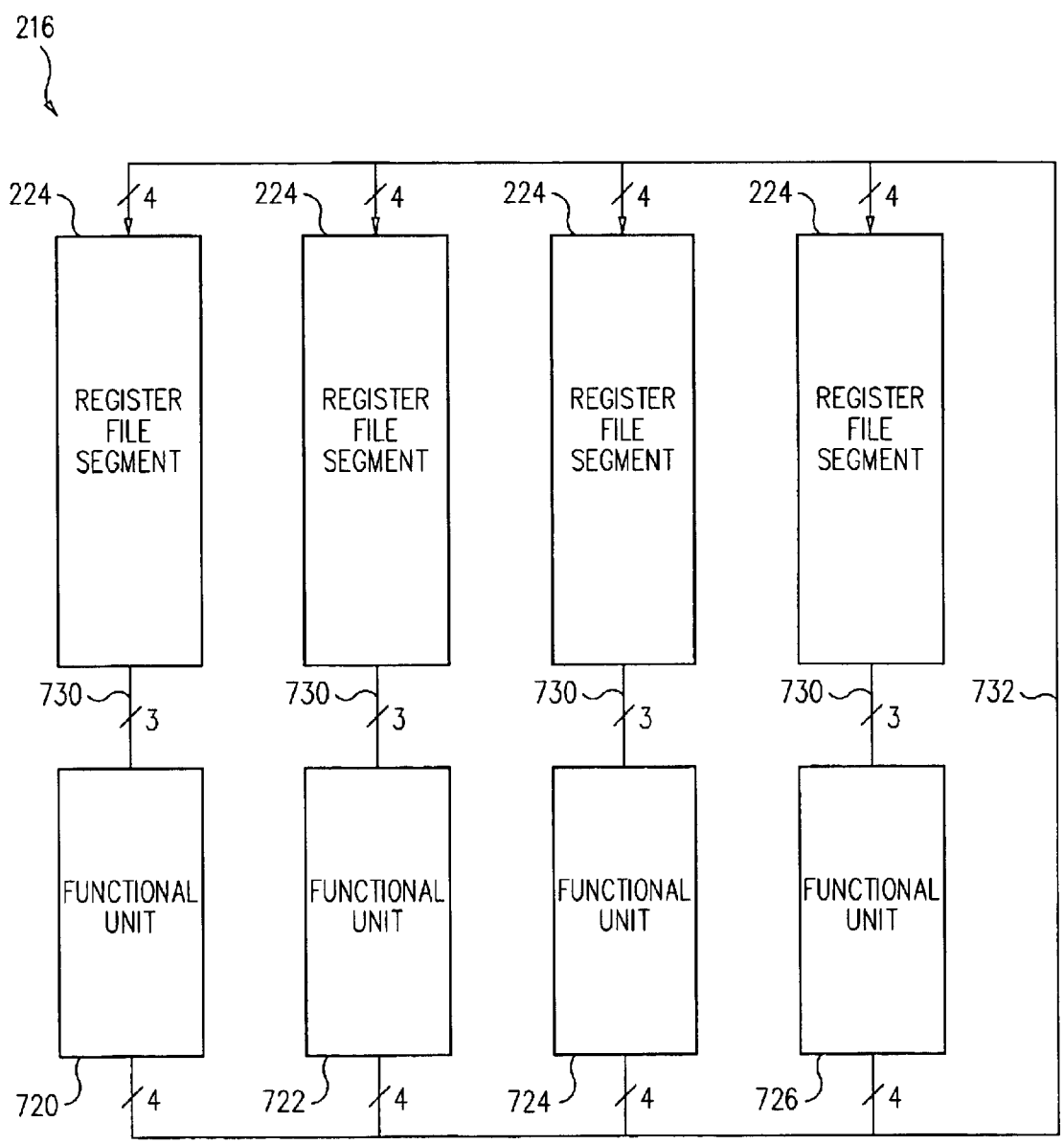
FIG. 8 is a schematic block diagram showing an arrangement of the register file into the four register file segments.

However, in this embodiment the register file 216 is not laid out in the conventional manner and instead is split into a plurality of separate and individual register file segments 224. Referring to FIG. 8, a schematic block diagram shows an arrangement of the register file 216 into the four register file segments 224. The register file 216 remains operational as a single logical register file in the sense that the four of the register file segments 224 contain the same number of registers and the same register values as a conventional register file of the same capacity that is not split. The separated register file segments 224 differ from a register file that is not split through elimination of lines that would otherwise connect ports to the memory cells. Accordingly, each register file segment 224 has connections to only three of the twelve read ports 730, lines connecting a register file segment to the other nine read ports are eliminated. All writes are broadcast so that each of the four register file segments 224 has connections to all four write ports 732. Thus each of the four register file segments 224 has three read ports and four write ports for a total of seven ports. The individual cells are connected to seven word lines and seven bit lines so that a memory array with a spacing of 1 $\mu$m between lines has an area of approximately 49 $\mu$m$^2$. In the illustrative embodiment, the four register file segments 224 have an area proportion to seven squared. The total area of the four register file segments 224 is therefore proportional to 49 times 4, a total of 196.

The split register file thus advantageously reduces the area of the memory array by a ratio of approximately 256/196 (1.3× or 30%). The reduction in area further advantageously corresponds to an improvement in speed performance due to a reduction in the length of the word lines 744 and the bit lines 746 connecting the array cells that reduces the time for a signal to pass on the lines. The improvement in speed performance is highly advantageous due to strict time budgets that are imposed by the specification of high-performance processors and also to attain a large capacity register file that is operational at high speed. For example, the operation of reading the register file 216 typically takes place in a single clock cycle. For a processor that executes at 500 MHz, a cycle time of two nanoseconds is imposed for accessing the register file 216. Conventional register files typically only have up to about 32 registers in comparison to the 128 registers in the illustrative register file 216 of the processor 100. A register file 216 substantially larger than the register file in conventional processors is highly advantageous in high-performance operations such as video and graphic processing. The reduced size of the register file 216 is highly useful for complying with time budgets in a large capacity register file.

Figure 9:
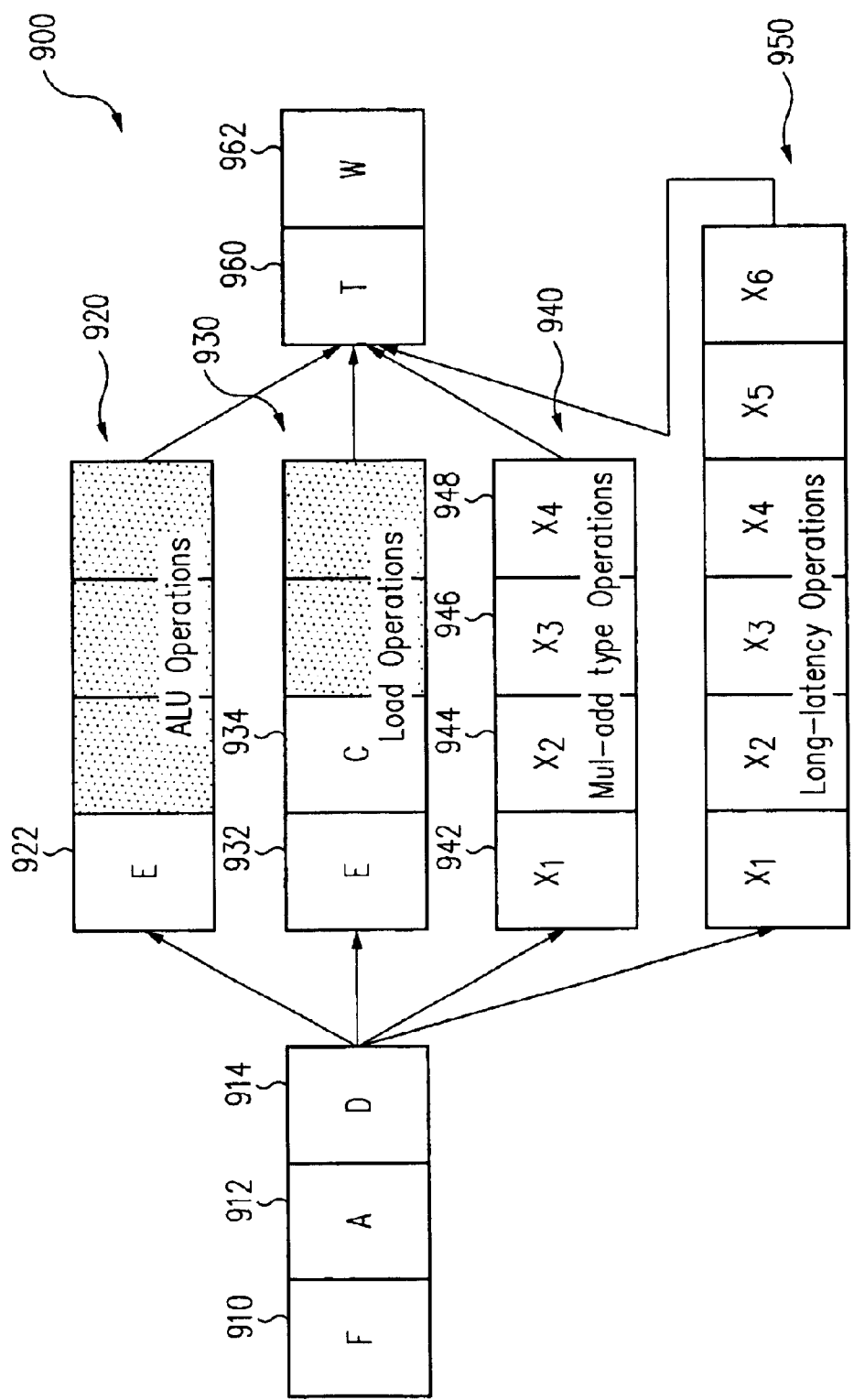
FIG. 9 is a schematic timing diagram that illustrates timing of the processor pipeline.

Referring to FIG. 9, a simplified schematic timing diagram illustrates timing of the processor pipeline 900. The pipeline 900 includes nine stages including three initiating stages, a plurality of execution phases, and two terminating stages. The three initiating stages are optimized to include only those operations necessary for decoding instructions so that jump and call instructions, which are pervasive in the Java™ language, execute quickly. Optimization of the initiating stages advantageously facilitates branch prediction since branches, jumps, and calls execute quickly and do not introduce many bubbles.

The first of the initiating stages is a fetch stage 910 during which the processor 100 fetches instructions from the 16 Kbyte two-way set-associative instruction cache 210. The fetched instructions are aligned in the instruction aligner 212 and forwarded to the instruction buffer 214 in an align stage 912, a second stage of the initiating stages. The aligning operation properly positions the instructions for storage in a particular segment of the four register file segments 310, 312, 314, and 316 and for execution in an associated functional unit of the three media functional units 220 and one general functional unit 222. In a third stage, a decoding stage 914 of the initiating stages, the fetched and aligned VLIW instruction packet is decoded and the scoreboard (not shown) is read and updated in parallel. The four register file segments 310, 312, 314, and 316 each holds either floating-point data or integer data. The register files are read in the decoding (D) stage.

Following the decoding stage 914, the execution stages are performed. The two terminating stages include a trap-handling stage 960 and a write-back stage 962 during which result data is written-back to the split register file 216.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, while the illustrative embodiment specifically discusses advantages gained in using the Java™ programming language with the described system, any suitable programming language is also supported. Other programming languages that support multiple-threading are generally more advantageously used in the described system. Also, while the illustrative embodiment specifically discusses advantages attained in using Java Virtual Machines™ with the described system, any suitable processing engine is also supported. Other processing engines that support multiple-threading are generally more advantageously used in the described system.

Furthermore, although the illustrative register file has one bit line per port, in other embodiments more bit lines may be allocated for a port. The described word lines and bit lines are formed of a metal. In other examples, other conductive materials such as doped polysilicon may be employed for interconnects. The described register file uses single-ended reads and writes so that a single bit line is employed per bit and per port. In other processors, differential reads and writes with dual-ended sense amplifiers may be used so that two bit lines are allocated per bit and per port, resulting in a bigger pitch. Dual-ended sense amplifiers improve memory fidelity but greatly increase the size of a memory array, imposing a heavy burden on speed performance. Thus the advantages attained by the described register file structure are magnified for a memory using differential reads and writes. The spacing between bit lines and word lines is described to be approximately 1 $\mu$m. In some processors, the spacing may be greater than 1 $\mu$m. In other processors the spacing between lines is less than 1 $\mu$m.

CROSS-REFERENCE

The present invention is related to subject matter disclosed in the following co-pending patent applications:

1. United States patent application entitled, "Clustered Architecture in a VLIW Processor", <atty. docket no.: SP-2608> naming Marc Tremblay and William Joy as inventors and filed on even date herewith;
2. United States patent application entitled, "Apparatus and Method for Optimizing Die Utilization and Speed Performance by Register File Splitting", <atty. docket no.: SP-2609> naming Marc Tremblay and William Joy as inventors and filed on even date herewith;
3. United States patent application entitled, "Variable Issue-Width VLIW Processor", <atty. docket no.: SP-2611> naming Marc Tremblay as inventor and filed on even date herewith;
4. United States patent application entitled, "Efficient Handling of a Large Register File for Context Switching", <atty. docket no.: SP-2612> naming Marc Tremblay and William Joy as inventors and filed on even date herewith;
5. United States patent application entitled, "Dual In-line Buffers for an Instruction Fetch Unit", <atty. docket no.: SP-2618> naming Marc Tremblay and Graham Murphy as inventors and filed on even date herewith;
6. United States patent application entitled, "An Instruction Fetch Unit Aligner", <atty. docket no.: SP-2619> naming Marc Tremblay and Graham Murphy as inventors and filed on even date herewith;
7. United States patent application entitled, "Local Stall Control Method and Structure in a Microprocessor", <atty. Docket no.: SP-3287> naming Marc Tremblay and Sharada Yeluri as inventors and filed on even data herewith;
8. United States patent application entitled, "Local and Global Register Partitioning in a VLIW Processor", <atty. Docket no.: SP-3288> naming Marc Tremblay and William Joy as inventors and filed on even data herewith; and
9. United States patent application entitled, "Implicitly Derived Register Specifiers in a Processor", <atty. Docket no.: SP-3289> naming Marc Tremblay and William Joy as inventors and filed on even data herewith.

What is claimed is:

1. A processor comprising:

a plurality of independent parallel execution paths that execute in parallel across a plurality of threads, the execution paths including a multiple instruction parallel pathway for execution of a thread; and the independent parallel execution paths including a plurality of functional units capable of executing a plurality of instructions in parallel from an instruction set that includes data handling instructions for multiple-thread execution on the plurality of functional units and one or more special purpose registers of a corresponding parallel execution path for fast bypass between different functional units thereof.

2. A processor according to claim 1 wherein:

the plurality of functional units include at least two types of functional units capable of executing different instruction sets.

3. A processor according to claim 1 wherein:

one or more of the functional units are capable of executing a store-to-instruction-space instruction for self-modifying code support.

4. A processor according to claim 1 wherein:
one or more of the functional units are capable of executing a branch instruction modified by a qualifier indicative of the branch predicted to be taken.

5. A processor according to claim 1 wherein:
one or more of the functional units are capable of executing a store pair instruction for storing a pair of adjacent registers to memory.

6. A processor according to claim 1 wherein:
one or more of the functional units are capable of executing instructions for accessing data both in little-endian order and big-endian order.

7. A processor according to claim 1 wherein:
one or more of the functional units are capable of executing a software trap instruction.

8. A processor according to claim 1 wherein:
one or more of the functional units are capable of executing load and store instructions for accessing data both in cacheable accesses and non-cacheable accesses.

9. A processor according to claim 1 wherein:
one or more of the functional units are capable of executing load and store instructions for accessing multiple-element groups of data both in cacheable accesses and non-cacheable accesses.

10. A processor according to claim 1 wherein:
one or more of the functional units are capable of executing a clip instruction that shifts a first register by two bits and has the least significant bits set to an indication of a comparison of second and third register values.

11. A processor according to claim 1 wherein:
the plurality of independent parallel instruction paths execute as a plurality of processors in multiple-threaded applications using a Java™ programming language running under a multiple-threaded operating system on a multiple-threaded Java Virtual Machine™.

12. A processor according to claim 1 wherein:
the processor includes two independent processor elements forming a respective two independent parallel execution paths.

13. A processor according to claim 12 wherein:
the two independent processor elements are Very Long Instruction Word (VLIW) processors forming a respective plurality of independent parallel execution paths.

14. A processor according to claim 12 wherein:
the two independent processor elements are integrated into a single integrated-circuit chip.

15. A processor comprising:
a plurality of independent processor elements in a single integrated circuit chip capable of executing a respective plurality of threads concurrently during a multiple-threaded operation, each of the independent processor elements comprising a plurality of processing units capable of executing a corresponding plurality of instructions in parallel from an instruction set that includes data handling instructions for multiple-thread execution on the plurality of processing units and one or more special purpose registers of a corresponding independent processor element for fast bypass between different processing units thereof.

16. A processor according to claim 15 wherein:
the plurality of processing units include at least two types of processing units that execute at least two different instruction types.

17. A processor according to claim 15 wherein:
one or more of the processing units are capable of executing instructions selected from among a group comprising:

a store-to-instruction-space instruction for self-modifying code support;
a branch instruction modified by a qualifier indicative of the branch predicted to be taken;
a store pair instruction for storing a pair of adjacent registers to memory;
instructions for accessing data both in little-endian order and big-endian order;
a software trap instruction;
load and store instructions for accessing data both in cacheable accesses and non-cacheable accesses;
load and store instructions for accessing multiple-element groups of data both in cacheable accesses and non-cacheable accesses; and
a clip instruction that shifts a first register by two bits and has the least significant bits set to an indication of a comparison of second and third register values.

18. A processor according to claim 15 wherein:
the independent processor elements are Very Long Instruction Word (VLIW) processors forming a respective plurality of independent parallel execution paths.

19. A processor according to claim 15 wherein:
the processor includes two independent processor elements in a single integrated circuit chip.

20. A processor according to claim 15 wherein:
the plurality of independent processor elements are Very Long Instruction Word (VLIW) processor elements that include the plurality of processing units operating concurrently in parallel, the processing units including media functional units operating as digital signal processors, and a general functional unit, and
the media functional units capable of executing a instruction that executes both a multiply operation and an addition operation in a single cycle, the multiply operation and add operations being either floating point or fixed point.

21. A processor comprising:
a plurality of independent processor elements in a single processor, each of the independent processor elements comprising:
an instruction supply logic;
a plurality of functional units coupled to the instruction supply logic the plurality of functional units capable of executing a plurality of instructions received from the instruction supply logic in parallel from an instruction set that includes data handling instructions for multiple-thread execution on the plurality of functional units and one or more special purpose registers of a corresponding independent processor element for fast bypass between different functional units thereof;
a register file coupled to the plurality of functional units, and coupled to the instruction supply logic, and
wherein each of the plurality of independent processor elements has independent and separate instruction supply logic, plurality of functional units, and register file from other ones of the plurality of independent processor elements; and
a data cache coupled to and shared among the plurality of independent processor elements.

22. A processor according to claim 21 wherein:
at least two types of the functional units execute different instructions.

23. A processor according to claim 21 wherein:
the plurality of independent processor elements are capable of executing a respective plurality of threads concurrently during a multiple-threaded operation.

24. A processor according to claim 21 wherein:
one or more of the functional units are capable of executing instructions selected from among a group comprising:
- a store-to-instruction-space instruction for self-modifying code support;
- a branch instruction modified by a qualifier indicative of the branch predicted to be taken;
- a store pair instruction for storing a pair of adjacent registers to memory; instructions for accessing data both in little-endian order and big-endian order; a software trap instruction;
- load and store instructions for accessing data both in cacheable accesses and non-cacheable accesses;
- load and store instructions for accessing multiple-element groups of data both in cacheable accesses and non-cacheable accesses; and
- a clip instruction that shifts a first register by two bits and has the least significant bits set to an indication of a comparison of second and third register values.

25. A processor according to claim 21 wherein:
the plurality of independent processor elements are integrated into a single integrated-circuit chip.

26. A processor according to claim 21 wherein:
an instruction supply logic includes an instruction cache for a first independent processor element that is independent and separate from an instruction cache of the instruction supply logic of a second independent processor element.

27. A processor according to claim 21 wherein:
the data cache is multiple-ported, allowing data access in execution paths of the plurality of independent processor elements in a single cycle.

28. A processor according to claim 21 wherein:
the data cache has a reduced data-handling logic resulting from sharing of the data cache among the plurality of independent processor elements, avoiding necessity of a cache coordination protocol and overhead logic otherwise incurred in controlling the coordination protocol.

29. A processor according to claim 21 wherein the independent processor elements further comprise:
an instruction preparation logic coupled to the instruction supply logic, wherein the instruction preparation logic comprises an aligner and an instruction buffer for the first independent processor element that is independent and separate from an aligner and instruction buffer of the supply logic of the second independent processor element, wherein the aligner aligns a full instruction group in preparation for accessing the register file.

30. A processor according to claim 21 wherein:
the register file is physically split into a plurality of register file segments, the individual register file segments being respectively associated and coupled to a functional unit of the plurality of functional units.

31. A method of operating a processor comprising:
executing in parallel a plurality of threads in a plurality of independent parallel execution paths;
executing within one of the threads a plurality of instructions in a multiple-instruction parallel pathway in one of the plurality of independent parallel execution paths, the plurality of instructions in the multiple-instruction parallel pathway including instructions from at least two distinct instruction subsets; and
executing a plurality of instructions in parallel from an instruction set that includes data handling instructions for multiple-thread execution on the plurality of functional units wherein executing the instructions in parallel comprises utilizing one or more special purpose registers for fast bypass between different functional units.

32. A method according to claim 31 further comprising:
executing the threads in the plurality of independent parallel execution paths as a plurality of processors in multiple-threaded applications using a Java™ programming language running under a multiple-threaded operating system on a multiple-threaded Java Virtual Machine™.

33. A method according to claim 31 further comprising:
executing the threads in the plurality of independent parallel instruction paths as a plurality of processors in multiple-threaded applications using a Java™ programming language; and
generating the plurality of threads that respectively execute in the plurality of independent parallel execution paths with a minimum of threading overhead.

34. A method according to claim 31 further comprising:
executing the threads in the plurality of independent parallel execution paths as a plurality of processors in multiple-threaded applications using a Java™ programming language; and
accessing arrays and instructions using instructions supporting garbage collection.

35. A method according to claim 31 further comprising:
executing within one of the threads a plurality of instructions in a multiple-instruction parallel pathway in one of the plurality of independent parallel execution paths using independent processor elements that are Very Long Instruction Word (VLIW) processors.

* * * * *

UNITED STATES PATENT AND TRADEMARK OFFICE
CERTIFICATE OF CORRECTION

PATENT NO.     : 6,718,457 B2
DATED          : April 6, 2004
INVENTOR(S)    : Tremblay et al.

It is certified that error appears in the above-identified patent and that said Letters Patent is hereby corrected as shown below:

Column 15,
Please add Section A (as follows) immediately after the last paragraph:

Section A

Assembler

Symbols

Except for symbols reserved for registers, Café assembler symbols are just like those for the SPARC assembler. See the SPARC assembler manual for those details.

The Café assembler uses the proc pseudo-op similar to SPARC's, but defines no operand for it. This pseudo-op should be used to mark the beginning of a function so the assembler can know to require the beginning of an instruction word. This only makes a practical difference if an immediately preceding function ends with an instruction that does not appear to consummate an instruction word, but using the .proc pseudo-op is a good habit in any case.

General Purpose Registers

Café has 256 32-bit general purpose registers, numbered 0 through 255. The assembler reserves symbols of the form:

[Rr]<digit><digit>* for general purpose register specifiers. That is, the letter R in either case followed by a non-empty string of decimal digits denotes a general purpose register. Strings of digits indicating values greater than 255 are diagnosed as errors.

In addition to these canonical register names, a few symbols are reserved for aliases of registers that have special uses.

sp   Stack Pointer, an alias for r1.
lp   Link Pointer. The call instruction puts the return address in lp, which is an alias for r2.
fp   Frame Pointer, an alias for r3.
gmr  GPU-to-MPU by-pass register, an alias for r6.
mgr  MPU-to-GPU by-pass register, an alias for r7.

Others register alias symbols may be defined as register use conventions evolve. None of these symbols is case-sensitive.

In addition to register symbols, a general purpose register can be denoted by a register expression of the form:

%%[Rr]?<constant-expression>

That is, double percent sign, optionally followed the letter R in either case, followed by a *first pass* (no forward references, no relocations) constant expression in the range of zero to 255. The optional R is of no value to the the assembler, but some users believe it's useful to see it in the source.

r0 is a fiat-zero source operand and a result-sink registers.

Control and Status Registers

In order to provide an extensible namespace for control and status registers, symbols denoting them begin with %. None of these symbols is case-sensitive.

UNITED STATES PATENT AND TRADEMARK OFFICE
CERTIFICATE OF CORRECTION

| | |
|---|---|
| PATENT NO. | : 6,718,457 B2 |
| DATED | : April 6, 2004 |
| INVENTOR(S) | : Tremblay et al. |

It is certified that error appears in the above-identified patent and that said Letters Patent is hereby corrected as shown below:

Program Counters

Documentation refers to a program counter, %pc, and its sidekick %npc, but it's not apparent that either is used by the assembler.

Processor Status Register

Café has a program status register, for which this assembler uses the symbol %psr. The layout of %psr follows. %psr can be read and modified by the getir and setir instructions using its internal register ordinal, 1.

Bit 24 of %psr specifies The processor ID. Clear denotes cpu0, and set denotes cpu1.

Bits 23 and 22 of %psr specify the current Trap Level.

Bit 21 of %psr determines the endianness of loads and stores. The initial state of this bit is clear, which means big-endian. When set it means little-endian.

Bit 20 of %psr is the Instruction Address Check Enable flag. Its description is yet to be supplied.

Bit 19 of %psr is the Data Address Check Enable flag. Its description is yet to be supplied.

Bit 18 of %psr is the Garbage Check Enable flag. Its description is yet to be supplied.

Bit 17 of %psr is the Data Cache Enable flag. When set, the data cache is enabled; when clear, data cache is disabled.

Bit 16 of %psr is the Instruction Cache Enable flag. When set, the instruction cache is enabled; when clear, instruction cache is disabled.

Bit 15 of %psr is the Supervisor Mode flag. When set it indicates the processor is in supervisor mode, which allows certain privileged activities. Among these privileged activities is the ability to change all but the two right-most fields of %psr. The Supervisor Mode flag is most often set during trap handling, which is explained in the Traps section of the microarchitecture manual.

Bit 14 of %psr is the Interrupt Enable flag. When set, interrupts are enabled. Its use is explained in the Traps section of the microarchitecture manual.

Bits 13 through 10 of %psr is the Processor Interrupt Level, which is explained in the Traps section of the microarchitecture manual.

The %psr fields that can be set when the Supervisor Mode flag is clear are grouped together at the low-order end. They follow.

A 2-bit field of %psr specifies the mode in effect for the saturated aithmetic performed by some of the parallel integer operations. The bounds for saturation are given in the adjacent table. Modes 00 and 01 are expressed as two's-complement 16-bit integers. Mode 10 is expressed in $S.15$ fixed-point. Mode 11 is $S2.13$ fixed-point. The simulator is using bits 8 and 9 of %psr for this specificatiom.

| mode | | bounds | |
|---|---|---|---|
| | | low | high |
| | 00 | 000000000...0 | 011111111...1 |
| | 01 | 100000000...0 | 011111111...1 |
| | 10 | 100000000...0 | 011111111...1 |
| | 11 | 111000000...0 | 001000000...0 |

(For those of us habituated to the common floating-point represesentation, the $Si.f$ notation in the preceding paragraph can be confusing. In these fixed point formats, the sign-bit $S$ is one bit of the integer part of the number. For example, in $S2.13$ format, the integer part is a two's complement 3-bit number. There is no "dedicated" sign-bit as with the floating-point representation, and thus no negative zero to worry about.)

The low-order eight bits of %psr are used as dirty bits for octants of the general purpose register file. A new process begins with all the dirty bits clear, and a octant's dirty bit is set when a register in that octant is written. Café's large register file is a formidable lot of state to manage during a context-switch. An isolated region of a long-running program that causes dirty bits to be set should clear them when it's safe to do so. Within this 8-bit field a given register number $N$ corresponds to the bit $(1 << (N >> 5))$.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

Trap Base Register

A vector of trap handler addresses is pointed-to by a trap base register, for which the assembler uses the symbol %tbr. Only the high-order 19 bits of %tbr are used to address the vector, so the vector must be positioned at an 8192-byte boundary. Details for use of the vector are described in the "Traps" chapter of the Café Architecture Manual.

The assembler's only concern is the ability to read or set %tbr using the getir and setir instructions. Reads of the low-order 13 bits of %tbr always return zero, and writes to the low-order 13 bits of %tbr are always ignored.

No other control or status registers are described yet. Those that will be defined that can be read or set will be accessible using the getir and setir instructions.

Instruction Set

Instruction Formats

Note: Since this document was written the term "SFU" has evolved to "GFU", and the term "UFU" has evolved to "MFU". Until there's no problem more important than changing all occurrences of the old terms here, the author apologizes for the inconvenience.

Café instructions are issued in instruction words composed of one SFU instruction and zero to three UFU instructions. An SFU instruction begins with a 2-bit header field that is a count of the UFU instructions that follow in the instruction word. All of the instructions in an instruction word are issued in the same cycle.

When there isn't useful work to do on all the UFUs, UFU instructions need not be present. However, the UFU on which an instruction executes is determined by the position of the instruction in the instruction word. To cause an instruction to execute on the second or third UFU, there must have been instructions in the previous slots of the instruction word. This is an issue when trying to avoid the latency of propagating a result from one FU to another.

The assembler infers the beginning of an instruction word from the presence of an SFU instruction. UFU instructions that follow form the rest of the instruction word. More than three consecutive UFU instructions are reported as a fatal error, since the assembler cannot create a well-formed Café instruction word from that.

Several mnemonics denote instructions implemented both as SFU and UFU operations. These mnemonics indicate an SFU instruction only when used at the beginning of an instruction word. An instruction word boundary is established when the immediately preceding instruction word uses all three of its UFU slots or by the presence of two adjacent semicolons (;;), the instruction word delimiter.

UNITED STATES PATENT AND TRADEMARK OFFICE
CERTIFICATE OF CORRECTION

PATENT NO.      : 6,718,457 B2
DATED           : April 6, 2004
INVENTOR(S)     : Tremblay et al.

It is certified that error appears in the above-identified patent and that said Letters Patent is hereby corrected as shown below:

Algebraicly, if not lexically, the double semicolon is a full colon, meaining it's time to flush the instruction word. For example:

```
   ;; add     r6,1,r6 ;   add     r7,1,r7 ;;
``` is a single instruction word beginnining with an SFU add operation and having a single UFU operation, also an add. But the similiar patern:

```
   ;; add     r6,1,r6 ;;  add     r7,1,r7 ;;
``` is two instruction words. each consisting of an SFU add operation.

SFU Instruction Formats

An SFU instruction begins with a 2-bit header (labeled hdr in the instruction format diagrams appearing later in this section) that gives the number of UFU instructions that follow the SFU instruction in the instruction word. That is, the header vaules and instruction word contents they indicate are:

| header value | instructions in instruction word |
|---|---|
| 00 | SFU only |
| 01 | SFU + UFU1 |
| 10 | SFU + UFU1 + UFU2 |
| 11 | SFU + UFU1 + UFU2 + UFU3 |

The first two bits of an SFU opcode determine the class of the operation. The values and classes are:

```
00   Call and branch
01   Compute
10   Memory (uncacheable)
11   Memory (cacheable)
```

Generally, the third bit of an SFU opcode, the *i-bit*, is set when an operation uses an immediate for its second source operand and clear when it does not. SFU opcodes beginning with 00 (call and branch) are 6 bits, and all others are 8 bits.

Opcodes for the memory operations can be shown in a matrix where the bits usually indicate cacheability, signedness, size, and direction:

Memory (cacheable, leading 11) Opcodes

|  |  | opcode[2:0] | | | | | | | |
|---|---|---|---|---|---|---|---|---|---|
|  |  | 0xx–(unsigned) | | | | 1xx–(signed) | | | |
|  |  | byte 000 | short 001 | word 010 | long 011 | byte 100 | short 101 | word 110 | long 111 |
| opcode[7:3] 11ixx | 11100 | ldub | ldus | lduw | ldpair | ldb | lds | ldw | (ldg) |
|  | 11101 | - | lduso | lduwo | ld_diag | - | ldso | ldwo | prefetch |
|  | 11110 | stb | sts | stw | stpair | cstb | csts | cstw | - |
|  | 11111 | s2ib | stso | stwo | st_diag | - | - | cas | - |

Memory (uncacheable, leading 10) Opcodes

|  |  | opcode[2:0] | | | | | | | |
|---|---|---|---|---|---|---|---|---|---|
|  |  | 0xx–(unsigned) | | | | 1xx–(signed) | | | |
|  |  | byte 000 | short 001 | word 010 | long 011 | byte 100 | short 101 | word 110 | long 111 |
| opcode[7:3] 10ixx | 10100 | ncldub | ncldus | nclduw | ncldg | ncldb | nclds | ncldw | - |
|  | 10101 | - | nclduso | nclduwo | - | - | ncldso | ncldwo | - |
|  | 10110 | ncstb | ncsts | ncstw | ncstpair | - | - | - | - |
|  | 10111 | - | ncstso | ncstwo | - | - | - | - | - |

Opcodes in the compute (leading 01) quadrant of the SFU opcode space generally are not assigned in ways where the bit patterns reveal much other than where the *i-bit* is used. Mnemonics in both the upper and lower halves of this table are those for opcodes that are the same except for a clear or set *i-bit*. Note that there are only three free spaces in the upper half and sixteen free in the upper half.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

Compute (leading 01) Opcodes

| | | | opcode[2:0] | | | | | | | |
|---|---|---|---|---|---|---|---|---|---|---|
| | | | 000 | 001 | 010 | 011 | 100 | 101 | 110 | 111 |
| opcode[7:3] 01ixx | i=0 | 01000 | add | - | sub | - | not | or | and | xor |
| | | 01001 | idiv | rem | ppower | cmovenz | sethi | cmovez | blockaddr | - |
| | | 01010 | shll | shrl | shra | - | cmpeq | cmplt | frecsqrt | - |
| | | 01011 | fcmpeq | fcmplt | fcmple | cmpult | fdiv | precsqrt | getir | setir |
| | i=1 | 01100 | add | - | sub | - | - | or | and | xor |
| | | 01101 | idiv | rem | - | cmovenz | - | cmovez | - | - |
| | | 01110 | shll | shrl | shra | - | cmpeq | cmplt | - | - |
| | | 01111 | - | - | - | cmpult | - | - | - | - |

Opcodes in the call and branch (leading 00) quadrant of the SFU opcode space have some irregularities compared to other SFU opcodes. Since call and nop opcodes must be unique in their higher-order six bits, they have effective footprints of four opcodes each. Similarly, bz and bnz, with their prediction qualifiers, each use up four opcode slots. This quadrant does not use the *i-bit* as the other three do.

Call and branch (leading 00) Opcodes

| | | opcode[2:0] | | | | | | | |
|---|---|---|---|---|---|---|---|---|---|
| | | 000 | 001 | 010 | 011 | 100 | 101 | 110 | 111 |
| opcode[7:3] 00xxx | 00000 | call | n/a | n/a | n/a | bz | bz,pt | bz,ph | bz,ph,pt |
| | 00001 | bnz | bnz,pt | bnz,ph | bnz,ph,pt | impl | done | retry | sir |
| | 00010 | softtrap | iflush | - | - | - | - | - | - |
| | 00011 | - | - | - | - | - | - | - | - |
| | 00100 | nop | nop | nop | nop | - | - | - | - |
| | 00101 | - | - | - | - | - | - | - | - |
| | 00110 | softtrap | membar | - | - | - | - | - | - |
| | 00111 | - | - | - | - | - | - | - | - |

The SFU instruction formats are:

- memory and compute

- sethi

Only the sethi instruction uses this format.

- call

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

Only the `call` instruction uses this format.

- branch

Only the `bz` and `bnz` instructions use this format.

---

UFU Instruction Formats

- three-source operand

| 11 | 6 | 8 | 8 | 8 | 8 |
|---|---|---|---|---|---|
| 00 | opcode | rd | rs1 | rs2 | rs3 |
| 01 | opcode | rd | rs1 | rs2 | immediate |
| 10 | opcode | rd | rs1 | immediate | rs3 |
| 11 | opcode | rd | rs1 | immediate | immediate |

- two-source operand

| 11 | 6 | 8 | 8 | 8 | 8 |
|---|---|---|---|---|---|
| 0 | opcode | rd | rs1 | rs2 | |
| 1 | opcode | rd | rs1 | | immediate |

The immediate field of the UFU two-source instruction is 14 bit to be consistent with very similar operations using the SFU `compute` format.

Instruction Categories

Integer Instructions

| mnemonic | argument list | opcode | L | operation |
|---|---|---|---|---|
| add | rs1,reg_or_imm14,rd | S-01100000<br>U-000000 | 1 | Add |
| addc | rs1,rs2,rs3,rd | U-000001 | 1 | Add with carry |
| cmovenz | rs1,reg_or_imm14,rd<br>rs1,reg_or_imm8,rd | S-01101011<br>U-*pseudo-op* | 1 | Move if not zero |
| cmovez | rs1,reg_or_imm14,rd<br>rs1,reg_or_imm8,rd | S-01101101<br>U-*pseudo-op* | 1 | Move if zero |

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

| mnemonic | argument list | opcode | L | operation |
|---|---|---|---|---|
| cmpeq | rs1,reg_or_imm14,rd | S-01i10100 U-101100 | 1 | Compare equals |
| cmplt | rs1,reg_or_imm14,rd | S-01i10101 U-101110 | 1 | Compare less than |
| cpicknz | rs1,reg_or_imm8,reg_or_imm8,rd | U-101010 | 1 | Conditionally (non-zero) pick |
| cpickz | rs1,reg_or_imm8,reg_or_imm8,rd | U-101011 | 1 | Conditionally (zero) pick |
| cmpult | rs1,reg_or_imm14,rd | S-01i11011 U-101111 | 1 | Compare less than |
| genborrow | rs1,reg_or_imm14,rd | U-101000 | 1 | Generate borrow |
| gencarry | rs1,reg_or_imm14,rd | U-101001 | 1 | Generate carry |
| getir | rs1,rd | S-01011110 | ? | Get internal register |
| idiv | rs1,reg_or_imm14,rd | S-01101000 | ? | Division |
| moveind | rs1,[rs2] | U-100010 | 2 | Move indirect |
| mul | rs1,reg_or_imm14,rd | U-000110 | 2 | Multiply |
| muladd | rs1,reg_or_imm8,reg_or_imm8,rd | U-001000 | 2 | Multiply add |
| mulsub | rs1,reg_or_imm8,reg_or_imm8,rd | U-001001 | 2 | Multiply add |
| padd | rs1,reg_or_imm14,rd | U-000100 | 1 | Parallel add |
| padds | rs1,rs2,rd | U-110100 | 1 | Saturating parallel add |
| pcmovenz | rs1,rs2,rd | U-111100 | 1 | Parallel move if not zero |
| pcmovez | rs1,rs2,rd | U-111101 | 1 | Parallel move if zero |
| pcmpeq | rs1,reg_or_imm14,rd | U-110001 | 1 | Parallel compare equal |
| pcmplt | rs1,reg_or_imm14,rd | U-110011 | 1 | Parallel compare less than |
| pmul | rs1,reg_or_imm14,rd | U-000111 | 2 | Parallel multiply |
| pmuladd | rs1,rs2,rs3,rd | U-001010 | 2 | Parallel multiply add |
| pmuladds | rs1,rs2,rs3,rd | U-111010 | 2 | Saturating parallel multiply add |
| pmulsub | rs1,rs2,rs3,rd | U-001011 | 2 | Parallel multiply subtract |
| pmulsubs | rs1,rs2,rs3,rd | U-111011 | 2 | Saturating parallel multiply subtract |
| psub | rs1,reg_or_imm14,rd | U-000101 | 1 | Parallel subtract |
| psubs | rs1,rs2,rd | U-110101 | 1 | Saturating parallel subtract |
| rem | rs1,reg_or_imm14,rd | S-01101001 | ? | Remainder |
| sethi | imm22,rd | S-01001100 | 1 | Sethi |
| setir | rs1,rd | S-01011111 | 1 | Set internal register |
| sub | rs1,reg_or_imm14,rd | S-01100010 U-000010 | 1 | Subtract |
| subc | rs1,rs2,rs3,rd | U-000011 | 1 | Subtract with carry |

Logical Instructions

| mnemonic | argument list | opcode | L | operation |
|---|---|---|---|---|
| and | rs1,reg_or_imm14,rd | S-01100110 U-010110 | 1 | And |
| cccb | rs1,reg_or_imm14,rd | U-111110 | 1 | Count consecutive clear bits |
| not | rs1,rd | S-01100100 U-010100 | 1 | Not |
| or | rs1,reg_or_imm14,rd | S-01100101 U-010101 | 1 | Or |
| pshll | rs1,reg_or_imm14,rd | U-011100 | 1 | Parallel shift left logical |
| pshra | rs1,reg_or_imm14,rd | U-011110 | 1 | Parallel shift right arithmetic |
| pshrl | rs1,reg_or_imm14,rd | U-011101 | 1 | Parallel shift right logical |
| shll | rs1,reg_or_imm14,rd | S-01i10000 U-011000 | 1 | Shift left logical |
| shra | rs1,reg_or_imm14,rd | S-01i10010 U-011010 | 1 | Shift right arithmetic |
| shrl | rs1,reg_or_imm14,rd | S-01i10001 U-011001 | 1 | Shift right logical |
| xor | rs1,reg_or_imm14,rd | S-01100111 U-010111 | 1 | Exclusive or |

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

Floating Point Instructions

| mnemonic | argument list | opcode | L | operation |
|---|---|---|---|---|
| clip | rs1,rs2,rs3,rd | U-011111 | 1 | Clip |
| fadd | rs1,rs2,rd | U-001100 | 4 | Single precision addition |
| fcmpeq | rs1,rs2,rd | S-01011000 | 1 | FP compare equals |
| fcmple | rs1,rs2,rd | S-01011010 | 1 | FP compare less than or equals |
| fcmplt | rs1,rs2,rd | S-01011001 | 1 | FP compare less than |
| fdiv | rs1,rs2,rd | S-01011100 | 6 | Single precision division |
| fmul | rs1,rs2,rd | U-001110 | 4 | Single precision mutiplication |
| fmuladd | rs1,rs2,rs3,rd | U-010000 | 4 | Single precision mutiply-add |
| fmulsub | rs1,rs2,rs3,rd | U-010001 | 4 | Single precision mutiply-subtract |
| frecsqrt | rs1,rd | S-01010110 | 6 | Single precision reciprocal square root |
| fsub | rs1,rs2,rd | U-001101 | 4 | Single precision subtraction |

Fixed-Point Instructions

The fixed-point operands of these instructions are in $S2.13$ format; that is, these instructions are unaffected by the fixed-point mode bits of the psr.. Precision may be lost as a result is rendered in that format. Overflows saturate.

| mnemonic | argument list | opcode | L | operation |
|---|---|---|---|---|
| ppower | rs1,rs2,rd | S-01101010 | 6 | Parallel exponentiation |
| precsqrt | rs1,rd | S-01011101 | 6 | Parallel reciprocal square root |

Convert Instructions

| mnemonic | argument list | opcode | L | operation |
|---|---|---|---|---|
| fix2flt | rs1,reg_or_imm14,rd | U-100111 | 4 | Fixed point to single precision |
| flt2fix | rs1,reg_or_imm14,rd | U-100110 | 4 | Single precision to fixed point |

Control Flow Instructions

| mnemonic | argument list | opcode | L | operation |
|---|---|---|---|---|
| bndck | rs1,reg_or_imm8,reg_or_imm8 | U-011011 | ? | Bound check |
| bnz | rd,label | S-000010ht | 1 | Branch if not zero |
| bz | rd,label | S-000001ht | 1 | Branch if zero |
| call | label | S-000000 | 1 | Call |
| done | no arguments | S-00001101 | ? | Skip trapped instruction |
| jmpl | rs1,rd | S-00001100 | 2 | Jump and link |
| nop | no arguments | S-001000XX | 1 | Null operation |
| retry | no arguments | S-00001110 | ? | Retry trapped instruction |
| return | rs1 | pseudo-op | 2 | Return |
| sir | no arguments | S-00001111 | ? | Software-initiated reset |
| softtrap | rs1,reg_or_imm14 | S-00110000 | ? | Software-initiated trap |

Memory Access Instructions

Café memory accesses can be done either big- or little-endian, with big-endian being the default. Endianness is controlled by a bit in %psr.

Instructions are stored big-endian. The assembler and linker assume that relocations and other initializations in sections other than code sections should also be treated as big-endian.

Most memory access instructions use a two-component effective address specification, denoted in this

UNITED STATES PATENT AND TRADEMARK OFFICE
CERTIFICATE OF CORRECTION

PATENT NO.   : 6,718,457 B2
DATED        : April 6, 2004
INVENTOR(S)  : Tremblay et al.

It is certified that error appears in the above-identified patent and that said Letters Patent is hereby corrected as shown below:

document by [address]. [address] may be [rs1+rs2], [rs1+simm14], or [rs1]. When [rs1] is specified, the assembler infers an immediate zero for the second address component of the instruction.

| mnemonic | argument list | opcode | L | operation |
|---|---|---|---|---|
| cas | rs1,[rs2],rd | S-11011110 | ? | Compare and swap (atomic) |
| cstb | rd,rs1,[rs2] | S-11010100 | ? | Conditional store byte |
| csts | rd,rs1,[rs2] | S-11010101 | ? | Conditional store short |
| cstw | rd,rs1,[rs2] | S-11010110 | ? | Conditional store word |
| iflush | no arguments | S-00010001 | ? | Flush instruction pipe |
| ldb | [address],rd | S-11100100 | 2 | Load byte |
| ldpair | [address],rd | S-11100011 | ? | Load pair |
| lds | [address],rd | S-11100101 | 2 | Load short |
| ldso | [address],rd | S-11101101 | 2 | Load short other-endian |
| ldub | [address],rd | S-11100000 | 2 | Load unsigned byte |
| ldus | [address],rd | S-11100001 | 2 | Load unsigned short |
| lduso | [address],rd | S-11101001 | 2 | Load unsigned short other-endian |
| lduw | [address],rd | S-11100010 | 2 | Load unsigned word |
| lduwo | [address],rd | S-11101010 | 2 | Load unsigned word other-endian |
| ldw | [address],rd | S-11100110 | 2 | Load word |
| ldwo | [address],rd | S-11101110 | 2 | Load word other-endian |
| membar | no arguments | S-00110001 | ? | Memory barrier |
| ncldb | [address],rd | S-10100100 | ? | Non-cacheable load byte |
| ncldg | [address],rd | S-10100011 | ? | Non-cacheable load group |
| nclds | [address],rd | S-10100101 | ? | Non-cacheable load short |
| ncldso | [address],rd | S-10101101 | ? | Non-cacheable load short other-endian |
| ncldub | [address],rd | S-10100000 | ? | Non-cacheable load unsigned byte |
| ncldus | [address],rd | S-10100001 | ? | Non-cacheable load unsigned short |
| nclduso | [address],rd | S-10101001 | ? | Non-cacheable load unsigned short other-endian |
| nclduw | [address],rd | S-10100010 | ? | Non-cacheable load unsigned word |
| nclduwo | [address],rd | S-10101010 | ? | Non-cacheable load unsigned word other-endian |
| ncldw | [address],rd | S-10100110 | ? | Non-cacheable load word |
| ncldwo | [address],rd | S-10101110 | ? | Non-cacheable load word other-endian |
| ncstb | rd,[address] | S-10110000 | ? | Non-cacheable store byte |
| ncstpair | rd,[address] | S-10110011 | ? | Non-cacheable store pair |
| ncsts | rd,[address] | S-10110001 | ? | Non-cacheable store short |
| ncstso | rd,[address] | S-10111001 | ? | Non-cacheable store short other-endian |
| ncstw | rd,[address] | S-10110010 | ? | Non-cacheable store word |
| ncstwo | rd,[address] | S-10111010 | ? | Non-cacheable store word other-endian |
| s2ib | rd,[address] | S-11111000 | 2 | Store byte to instruction |
| stb | rd,[address] | S-11110000 | 1 | Store byte |
| stpair | rd,[address] | S-11110011 | ? | Store pair |
| sts | rd,[address] | S-01110001 | 1 | Store short |
| stso | rd,[address] | S-01111001 | 1 | Store short other-endian |
| stw | rd,[address] | S-10110010 | 1 | Store word |
| stwo | rd,[address] | S-10111010 | 1 | Store word other-endian |

[still missing prefetch, ld_diag and st_diag, at least]

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

Pixel Instructions

| mnemonic | argument list | opcode | L | operation |
|---|---|---|---|---|
| bitext | rs1,rs2,rs3,rd | U-111111 | 2 | Bit extract |
| byteshuffle | rs1,rs2,rs3,rd | U-100001 | 2 | Byte extract |
| pack | rs1,rs2,rs3,rd | U-100000 | 1 | Pack |
| pdist | rs1,rs2,rd | U-100101 | 4 | Pixel distance |
| pmean | rs1,rs2,rd | U-100100 | 1 | Parallel mean |

Scheduling

Note: This section is superseded by the "Code Scheduling Guidlines" section of the Café Microprocessor Architecture Manual. Please feel free to recommend improvements or corrections to this material, but refer to the manual for the definitive treatment.

None of the results of UFU operations is scoreboarded. All loads and a few non-pipelined long-latency SFU operations such as idiv, fdiv, frecsqrt, precsqrt, and ppower (the complete list is not determined) are scoreboarded. Non-scoreboarded results are available to subsequent operations on the unit that produces them after their latencies; earlier use is erroneous. Latencies are shown in the columns labelled "L" in the tables in the preceding section.

A result produced on one unit is available as an operand on another unit when it is being written to the register file (that is, when it reaches pipe stage W1). Earlier use is erroneous. This takes 5 cycles on a UFU. On the SFU this takes one cycle more than the latency of the producing operation. The difference is because UFU results have to pass through all 4 E-stages of a pipe before reaching W1, and SFU results do not.

Use of a scoreboarded result register as an operand causes instruction issue to stall for as many cycles as it takes for that result to become available. If the referencing instruction that provokes the stall is also on the SFU, the stall is only until the result is available for intra-unit bypass. In the case of a load that hits in the cache, the stall could be as short as a single cycle. If the referencing instruction is on a UFU, stall lasts until the result reaches stage W1, where it can be bypassed on its way to the register file.

To help improve the latency of feeding operations not available on all units, special bypass registers are available. A completed (that is, finished but not yet in W1) instruction's result can be bypassed from the first UFU to the SFU if its destination register is *r4*. Likewise, a completed instruction's result can be bypassed from the SFU to the the first UFU if its destination register is *r5*.

Multiple writes to the same register of the register file in the same same cycle is an erroneous condition with an undefined result. More generally, any time a given register is the destination of more than operation in progress, the program is erroneous. Suppose that unit's 4-E-stage pipe sees a sequence of operations like:

```
cycle   operation
  0     4-cycle op -> r10
  1     4-cycle op -> r10
  2     anything
  3     anything
  4     any op using cycle zero's r10 as a source
  5     any op using cycle one's r10 as a source
```

Before being too awestruck by this tight scheduling, consider what happens if issue has to stall, say for icache fill, in cycle two or three: both uses of *r10* will get the result produced by the op that started in cycle one. Never issue a redefinition of a register's value between a definition and a use. The value that will reach the use is not deterministic.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

Instruction Details add add is an integer instruction that computes "$r[rs1] + r[rs2]$" or "$r[rs1] + sign\_ext(imm14)$". The use of an immediate for the second source operand sets the *i-bit* of the opcode of the SFU version or the first header bit of the UFU version. The resulting sum is left in $r[rd]$.

The suggested assembler syntax is:

add     rs1,reg_or_imm14,rd

The SFU version of this instruction uses the SFU compute format, and the UFU version uses the UFU 2-source format.

addc, subc addc and subc are integer instructions that compute "$r[rs1] + r[rs2] + r[rs3]$" or "$r[rs1] - r[rs2] - r[rs3]$", respectively. Only the least significant bit of $r[rs3]$, which is expected to be the result of a gencarry or genborrow, is used. The result is left in $r[rd]$.

The suggested assembler syntax is:

addc    rs1,rs2,rs3,rd
        subc    rs1,rs2,rs3,rd addc and subc are UFU instructions that use the UFU 3-source format.

and and is a logical instruction that computes "$r[rs1] \& r[rs2]$" or "$r[rs1] \& imm14$". The use of an immediate for the second source operand sets the *i-bit* of the opcode of the SFU version or the first header bit of the UFU version. The result is left in $r[rd]$.

The suggested assembler syntax is:

and     rs1,reg_or_imm14,rd

The SFU version of and uses the SFU compute format, and the UFU version uses the UFU 2-source format.

bitext bitext is a pixel instruction that extracts bits from the pair of registers $r[rs1]$ and $r[rs2]$. The extracted field is described by a 6-bit length in bits 21..16 of $r[rs3]$ and a 5-bit skip count in bits 4..0 of $r[rs3]$. The skip count is applied at the left-most (high-order) end of $r[rs1]$. The extracted field is right justified in $r[rd]$ without sign-extension.

(The illustration below is appropriated from a someone else's slide. I hope the stylistic change is not too jarring, but prose description has not been lucid for some readers.)

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

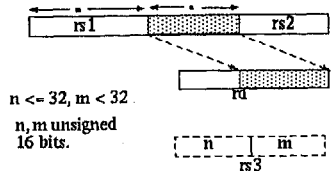

The suggested assembler syntax is:

```
bitext   rs1,rs2,rs3,rd
``` bitext is an UFU operation that uses the UFU 3-source format.

bndck bndck is a control flow instruction that causes a trap if "r[rs1] == 0", the second source operand is less than zero, or if the second source operand is greater than or equal to the third source operand. What it means to trap is not yet defined.

The second source operand can be either r[rs2] or sign_ext(imm8), and the third source operand can be either r[rs3] or sign_ext(imm8). The use of an immediate for either causes the appropriate header bit to be set in the instruction.

The suggested assembler syntax is:

```
bndck   rs1,reg_or_imm8,reg_or_imm8
``` bndck is a UFU operation that uses the UFU 3-source format. The operation has no use for this format's r[rd], which the assembler will make appear to be zero.

bnz bnz is a control flow instruction for a branch to the offset implied by the difference between the program counter and the specified label if the value in "r[rd]" is not equal to the integer zero. "label" is a label at the branch target; the assembler will either determine the displacement or generate relocation information so a linker can determine it. Whenever the displacement is determined, it must be expressible in a signed 22-bit field.

The mnemonic may be followed optionally by the qualifier ,pt, which means this conditional branch is staticly predicted to be taken. The use of this qualifier sets the T-bit in the instruction.

The suggested assembler syntax is:

```
bnz      rd,label
bnz,pt   rd,label
``` bnz is an SFU operation that uses the branch instruction format.

byteshuffle byteshuffle is a pixel instruction that copies the bytes from its sources r[rs1] and r[rs2] to byte positions of r[rd] according to the pattern described by the bits of the least significant two bytes of r[rs3].

Each group of four contiguous bits the lower-order two bytes of r[rs3] is the ordinal of the byte position of the eight bytes of the register pair r[rs1]-r[rs2] from which a byte is copied to the corresponding byte of r[rd]. An out-of-range byte ordinal (that is, a value greater than 7) means the corresponding byte of r[rd] will be zeroed.

The suggested assembler syntax is:

```
byteshuffle   rs1,rs2,rs3,rd
``` byteshuffle is a UFU operation that uses the UFU 3-source format.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

bz bz is a control flow instruction for a branch to the offset implied by the difference between the program counter and the specified label if the value in "$r[rd]$" is equal to the integer zero. "*label*" is a label at the branch target; the assembler will either determine the displacement or generate relocation information so a linker can determine it. Whenever the displacement is determined, it must be expressible in a signed 22-bit field.

The mnemonic may be followed optionally by the qualifier *.pt*, which means this conditional branch is staticly predicted to be taken. The use of this qualifier sets the $T$-bit in the instruction.

Unconditional branches are commonly coded using bz with r0 for the register operand. When the assembler sees this "unconditional conditional" branch without prediction, it will infer the ".*pt*" qualification, which can improve instruction prefetching.

The suggested assembler syntax is:

```
bz      rd,label
bz,pt   rd,label
``` bz is an SFU operation that uses the branch instruction format.

call call is a control flow instruction causes a control transfer to the address specified by its *label* operand. A call to address zero is an illegal instruction.

The return address (%npc at the time of the call) is left in *r2*, an implicit operand of this instruction. For that reason the assembler has the alias *lp* ("link pointer") for *r2*.

The suggested assembler syntax is:

```
call label
``` call is an SFU operation that uses a format of its own.

cas cas is a memory access instruction that compare the content of register $r[rs1]$ with the content of the 32-bit word in memory addressed by $r[rs2]$. If those values are equal, the content of register $r[rd]$ is swapped with the word addressed by $r[rs2]$. Otherwise, the content of the addressed memory word is unchanged, but the value at that memory address replaces the content of register $r[rd]$.

The effective address from which to load must be word-aligned, but the consequences of failing to do that are not defined.

Note that cas uses dcache, which makes it unsuitable for thread synchronization in a multi-Café configuration.

The suggested assembler syntax is:

```
cas    rs1,[rs2],rd
``` cas is an SFU operation that use the 2-source register variant of the SFU memory format. Since it always uses two source registers, the *i-bit* of its opcodes is always clear.

cccb cccb is a logical instruction that counts consecutive clear bits is its first source operand, $r[rs1]$, beginning from the high-order bit, first skipping the number of bits specified by the second source operand. The second source operand my be either a register or an immediate. In either case, only the the low-order 5 bits of the skip-count are used. The count of clear bits is left in $r[rd]$.

The suggested assembler syntax is:

```
cccb    rs1,reg_or_imm14,rd
``` cccb is an UFU operation that uses the UFU 2-source format.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

clip clip is a floating point instruction that computes:

```
((r[rs1] > r[rs2] ? 1 : 0) << 1) |
(r[rs1] < -r[rs2] ? 1 : 0) |
(r[rs3] << 2)
``` and leaves the result in r[rd]. The practical effect of this operation is to return a copy of r[rs3] shifted left 2 bits with the two least significant bits occupied by indications of how the single-precision floating point numbers in r[rs1] and r[rs2] compare.

The suggested assembler syntax is:

```
clip    rs1,rs2,rs3,rd
``` clip is a UFU operation that uses the UFU 3-source format, but the variants of that format that allow immediates for the second and third source operand are not used.

--- cmovenz cmovenz is an integer instruction that copies the value of the second source operand, specified by "r[rs2]" or "sign_ext(imm)", to the result register r[rd] only if the first source operand, r[rs1], is non-zero. Note that cmovenz allows a 14-bit immediate on the SFU but only an 8-bit immediate on a UFU.

The suggested assembler syntax is:

```
cmovenz   rs1,reg_or_imm14,rd    ! SFU
cmovenz   rs1,reg_or_imm8,rd     ! UFU
```

The SFU version of cmovenz uses the SFU compute format. The UFU version of cmovenz is a pseudo-op for the cpicknz instruction with r[rd] replicated in the r[rs3] field.

--- cmovez cmovez is an integer instruction that copies the value of the second source operand, specified by "r[rs2]" or "sign_ext(imm)", to the result register r[rd] only if the first source operand, r[rs1], is zero. Note that cmovez allows a 14-bit immediate on the SFU but only an 8-bit immediate on a UFU.

The suggested assembler syntax is:

```
cmovez    rs1,reg_or_imm14,rd    ! SFU
cmovez    rs1,reg_or_imm8,rd     ! UFU
```

The SFU version of cmovez uses the SFU compute format. The UFU version of cmovez is a pseudo-op for the cpickz instruction with r[rd] replicated in the r[rs3] field.

--- cmpeq cmpeq is an integer instruction that computes "r[rs1] == r[rs2]" or "r[rs1] == sign_ext(imm14)". The use of an immediate for the second source operand sets the *i-bit* of the opcode. The resulting zero or one is left in r[rd].

The suggested assembler syntax is:

```
cmpeq    rs1,reg_or_imm14,rd
```

The SFU version of this instruction uses the SFU compute format, and the UFU version uses the UFU 2-source format.

--- cmplt cmplt is an integer instruction that computes "r[rs1] < r[rs2]" or "r[rs1] < sign_ext(imm14)". The use of an immediate for the second source operand sets the *i-bit* of the opcode. The resulting zero or one is left in r[rd].

The suggested assembler syntax is:

```
cmplt    rs1,reg_or_imm14,rd
```

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

The SFU version of this instruction uses the SFU compute format, and the UFU version uses the UFU 2-source format.

cmpult cmpult is an integer instruction that computes "$(unsigned)\ r[rs1] < (unsigned)\ r[rs2]$" or "$(unsigned)\ r[rs1] < (unsigned)\ imm14$". The use of an immediate for the second source operand sets the $i$-$bit$ of the opcode. The resulting zero or one is left in $r[rd]$.

The suggested assembler syntax is:

```
cmpult    rs1,reg_or_imm14,rd
```

The SFU version of this instruction uses the SFU compute format, and the UFU version uses the UFU 2-source format.

cpicknz cpicknz is an integer instruction that assigns its second source operand to $r[rd]$ if the first source operand, $r[rs1]$, is non-zero; otherwise, the third source operand is assigned to $r[rd]$. Each of the second and third source operands can be either a register or a sign-extended 8-bit immediate.

The suggested assembler syntax is:

```
cpicknz   rs1,reg_or_imm8,reg_or_imm8,rd
``` cpicknz is a UFU operation that uses the UFU 3-source format.

cpickz cpickz is an integer instruction that assigns its second source operand to $r[rd]$ if the first source operand, $r[rs1]$, is zero; otherwise, the third source operand is assigned to $r[rd]$. Each of the second and third source operands can be either a register or a sign-extended 8-bit immediate.

The suggested assembler syntax is:

```
cpickz    rs1,reg_or_imm8,reg_or_imm8,rd
``` cpickz is a UFU operation that uses the UFU 3-source format.

cstb, csts, cstw cstb, csts, and cstw are memory access instructions that, if the value in the register $r[rs1]$ is non-zero, store the value the register $r[rd]$ at the address in register $r[rs2]$.

The effective address to which to store must be aligned to a natural boundary for the size of the store, but the consequences of failing to do that are not defined.

The suggested assembler syntax is:

```
cstb    rd,rs1,[rs2]
csts    rd,rs1,[rs2]
cstw    rd,rs1,[rs2]
``` cst{b,s,w} are SFU operations that use the 2-source register variant of the SFU memory format. Since they always use two source registers, the $i$-$bit$ of their opcodes is always clear.

done done is a control flow instruction causes a control transfer from a trap handler to the next instruction word after the instruction that caused the trap. Please refer to the Traps chapter of the Café Microarchitecture specification for the complete description.

The suggested assembler syntax is:

```
done
``` done is a SFU operation that uses the SFU compute format, but it has no use for any operand.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

fadd fadd is a floating point instruction that computes "$r[rs1] + r[rs2]$", where the values of the source operands are IEEE single-precision floating point numbers. The result is delivered in $r[rd]$.

The suggested assembler syntax is:

```
fadd    rs1,rs2,rd
``` fadd is a UFU operation that uses the UFU 2-source format.

--- fcmpeq fcmpeq is a floating point instruction that compares the single-precision floating point operands in its source registers $r[rs1]$ and $r[rs2]$ for equality. The destination register $r[rd]$ set set to the integer value if the source operands are equal and zero otherwise. If either source operand is a NaN, they are not equal.

The suggested assembler syntax is:

```
fcmpeq  rs1,rs2,rd
``` fcmpeq is a SFU operation that uses the SFU compute format.

--- fcmple fcmple is a floating point instruction that set its destination register $r[rd]$ to the integer value 1 if the single-precision floating point value in $r[rs1]$ is less than or equal to the single-precision floating point value in $r[rs2]$ and to zero otherwise. If the value of either source operand is a NaN, the result is zero.

The suggested assembler syntax is:

```
fcmple  rs1,rs2,rd
``` fcmple is a SFU operation that uses the SFU compute format.

--- fcmplt fcmplt is a floating point instruction that set its destination register $r[rd]$ to the integer value 1 if the single-precision floating point value in $r[rs1]$ is less than the single-precision floating point value in $r[rs2]$ and to zero otherwise. If the value of either source operand is a NaN, the result is zero.

The suggested assembler syntax is:

```
fcmplt  rs1,rs2,rd
``` fcmplt is a SFU operation that uses the SFU compute format.

--- fdiv fdiv is a floating point instruction that computes "$r[rs1] / r[rs2]$", where the value of the source operands are IEEE single-precision floating point numbers. The result is delivered in $r[rd]$.

The suggested assembler syntax is:

```
fdiv    rs1,rs2,rd
``` fdiv is a SFU operation that uses the SFU compute format.

--- fix2flt fix2flt is a convert instruction that converts a fixed point value in $r[rs1]$, with its binary point specified by the low-order 5 bits of $r[rs2]$ or $imm14$, to a single precision floating point result in $r[rd]$.

The suggested assembler syntax is:

```
fix2flt rs1,reg_or_imm14,rd
``` fix2flt is an UFU operation that uses the UFU 2-source format.

UNITED STATES PATENT AND TRADEMARK OFFICE
CERTIFICATE OF CORRECTION

PATENT NO.    : 6,718,457 B2
DATED         : April 6, 2004
INVENTOR(S)   : Tremblay et al.

It is certified that error appears in the above-identified patent and that said Letters Patent is hereby corrected as shown below:

flt2fix flt2fix is a convert instruction that converts a single precision floating point value in $r[rs1]$ to a fixed point result in $r[rd]$ with the binary point as specified by the low-order 5 bits of $r[rs2]$ or $imm14$.

The suggested assembler syntax is:

```
flt2fix  rs1,reg_or_imm14,rd
``` flt2fix is an UFU operation that uses the UFU 2-source format.

fmul fmul is a floating point instruction that computes "$r[rs1] * r[rs2]$", where the values of the source operands are IEEE single-precision floating point numbers. The result is delivered in $r[rd]$.

The suggested assembler syntax is:

```
fmul    rs1,rs2,rd
``` fmul is a UFU operation that uses the UFU 2-source format.

fmuladd fmuladd is a floating point instruction that computes "$(r[rs1] * r[rs2]) + r[rs3]$", where the values of the source operands are IEEE single-precision floating point numbers. The result is delivered in $r[rd]$.

The suggested assembler syntax is:

```
fmuladd rs1,rs2,rs3,rd
``` fmuladd is a UFU operation that uses the UFU 3-source format.

fmulsub fmulsub is a floating point instruction that computes "$(r[rs1] * r[rs2]) - r[rs3]$", where the values of the source operands are IEEE single-precision floating point numbers. The result is delivered in $r[rd]$.

The suggested assembler syntax is:

```
fmulsub rs1,rs2,rs3,rd
``` fmulsub is a UFU operation that uses the UFU 3-source format.

frecsqrt frecsqrt is a floating point instruction that computes the reciprocal square root of the single-precision floating-point number in $r[rs1]$ and puts that result in $r[rd]$. What will this do with an argument less than or equal to zero?

The suggested assembler syntax is:

```
frecsqrt rs1,rd
``` frecsqrt is an SFU operation that uses the SFU compute format, but has no use for the second source operand of that format.

fsub fsub is a floating point instruction that computes "$r[rs1] - r[rs2]$", where the values of the source operands are IEEE single-precision floating point numbers. The result is delivered in $r[rd]$.

The suggested assembler syntax is:

```
fsub    rs1,rs2,rd
``` fsub is a UFU operation that uses the UFU 2-source format.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

genborrow, gencarry genborrow and gencarry are integer instructions that generate a one or zero in $r[rd]$ if subtracting or adding, respectively, the source operands generates a borrow or carry, respectively. The result would be useful as the third source operand of sesequent addc and subc operations.

The suggested assembler syntax is:

```
genborrow  rs1,reg_or_imm14,rd
gencarry   rs1,reg_or_imm14,rd
``` genborrow and gencarry are are UFU operations that use the UFU 2-source format.

getir getir is an integer instruction that gets the value of the internal register the ordinal of which is its $r[rs1]$ operand and puts that value in the register specified by $r[rd]$.

The suggested assembler syntax is:

```
getir  rs1,rd
``` getir is an SFU operation that uses the SFU compute format, though in an irregular way. It has no use for the second source field, and the first source operand is an internal register number, NOT one of the general purpose registers.

idiv idiv is an integer instruction that computes "$r[rs1] / r[rs2]$" or "$r[rs1] / sign\_ext(imm14)$". The use of an immediate for the second source operand sets the *i-bit* of the opcode. The result is left in $r[rd]$.

If the second source operand is zero, idiv will trap.

The suggested assembler syntax is:

```
idiv   rs1,reg_or_imm14,rd
``` idiv is an SFU operation that uses the SFU compute format.

iflush iflush is a memory access instruction that is used to make sure that modifications to code space are visible by the processor executing the iflush. iflush invalidates all younger instructions that have already entered the pipe.

The suggested assembler syntax is:

```
iflush
``` iflush is an SFU operation that uses the compute instruction format, but uses none of that format's operands.

jmpl jmpl is a control flow instruction that causes a register-indirect control transfer to the address in $r[rs1]$. The current value of %npc is left in $r[rd]$.

If the branch target is an entry-point that might also expect to be reached by a call instruction, a register other than lp is a poor choice for $r[rd]$.

The suggested assembler syntax is:

```
jmpl   rs1,rd
``` jmpl is an SFU operation that uses the compute instruction format. The second source operand of that format is not used by jmpl.

ldb, lds, ldw ldb, lds, and ldw are memory access instructions that load an 8-bit byte, a 16-bit short, or a 32-bit word from address into the destination register $r[rd]$. The value loaded is sign-extended in the destination register. The use of an immediate for the second component of the address sets the *i-bit* of the opcode.

The effective address from which to load must be aligned to a natural boundary for the size of the load, but the consequences of failing to do that are not defined.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

The suggested assembler syntax is:

```
ldb     [address],rd
lds     [address],rd
ldw     [address],rd
``` ld[b,s,w] instructions are SFU operations that use the SFU memory format.

ldso, ldwo ldso and ldwo are memory access instructions that load a 16-bit short or a 32-bit word from address into the destination register r[rd] using the opposite endianness from that indicated by the *endian-bit* of %psr. The value loaded is sign-extended in the destination register. The use of an immediate for the second component of the address sets the *i-bit* of the opcode.

The effective address from which to load must be aligned to a natural boundary for the size of the load, but the consequences of failing to do that are not defined.

The suggested assembler syntax is:

```
ldso    [address],rd
ldwo    [address],rd
``` ldso and ldwo are SFU operations that use the SFU memory format.

ldpair ldpair is a memory access instruction that performs a load into a pair of adjacent registers beginning at the register specified by r[rd] from address. The use of an immediate for the second component of the address sets the *i-bit* of the opcode. r[rd] must be an even-numbered register.

The effective address from which to load must be even word-aligned, but the consequences of failing to do that are not defined.

The suggested assembler syntax is:

```
ldpair  rd,[address]
``` ldpair is an SFU operation that uses the SFU memory format.

ldub, ldus, lduw ldub, ldus, and lduw are memory access instructions that load an unsigned 8-bit byte, an unsigned 16-bit short, or an unsigned 32-bit word from address into the destination register r[rd]. The use of an immediate for the second component of the address sets the *i-bit* of the opcode.

The effective address from which to load must be aligned to a natural boundary for the size of the load, but the consequences of failing to do that are not defined.

While Café registers are 32-bits the behavior of lduw and ldw is identical. Future extension is liable to to change that, so appropriate consideration should be used when choosing between these instructions.

The suggested assembler syntax is:

```
ldub    [address],rd
ldus    [address],rd
lduw    [address],rd
``` ldu[b,s,w] instructions are SFU operations that use the SFU memory format.

lduso, lduwo lduso, and lduwo are memory access instructions that load an unsigned 16-bit short or an unsigned 32-bit word from address into the destination register r[rd] using the opposite endianness from that indicated by the *endian-bit* of %psr. The use of an immediate for the second component of the address sets the *i-bit* of the opcode.

The effective address from which to load must be aligned to a natural boundary for the size of the load, but the consequences of failing to do that are not defined.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

While Café registers are 32-bits the behavior of lduwo and ldwo is identical. Future extension is liable to to change that, so appropriate consideration should be used when choosing between these instructions.

The suggested assembler syntax is:

lduso    [address],rd
    lduwo    [address],rd lduso and lsuwo are SFU operations that use the SFU memory format.

membar membar is memory access instruction that specifies that all memory reference instructions already issued must be performed before any subsequent memory reference instruction may be initiated.

The suggested assembler syntax is:

membar membar is an SFU operation that uses the compute instruction format, but uses none of that format's operands.

moveind moveind is an integer instruction that copies the content of its first source operand, $r[rs1]$, to the register indicated by the least significant eight bits of its second source register, $r[rs2]$.

The suggested assembler syntax is:

moveind  rs1,[rs2]

moveind is a UFU operation that uses the UFU 2-source format, but it has no use for the destination register field and does not accept an immediate for the second source operand.

mul mul is an integer instruction that computes "$r[rs1] * r[rs2]$" or "$r[rs1] * sign\_ext(imm14)$". The use of an immediate for the second source operand sets the first bit of the instruction header. The result is left in $r[rd]$.

The suggested assembler syntax is:

mul     rs1,reg_or_imm14,rd mul is a UFU operation that uses the UFU 2-source format.

muladd muladd is an integer instruction that computes "$(r[s1] * r[s2]) + r[s3]$", "$(r[s1] * r[s2]) + sign\_ext(imm8)$", "$(r[s1] * sign\_ext(imm8)) + r[s3]$", or "$(r[s1] * sign\_ext(imm8)) + sign\_ext(imm8)$" and puts the result in $r[rd]$. The use of an immediate for the second or third source operand sets the first or second bit, respectively, of the instruction header.

The suggested assembler syntax is:

muladd  rs1,reg_or_imm8,reg_or_imm8,rd muladd is a UFU operation that uses the UFU 3-source format.

mulsub mulsub is an integer instruction that computes "$(r[s1] * r[s2]) - r[s3]$", "$(r[s1] * r[s2]) - sign\_ext(imm8)$", "$(r[s1] * sign\_ext(imm8)) - r[s3]$", or "$(r[s1] * sign\_ext(imm8)) - sign\_ext(imm8)$" and puts the result in $r[rd]$. The use of an immediate for the second or third source operand sets the first or second bit, respectively, of the instruction header.

The suggested assembler syntax is:

mulsub  rs1,reg_or_imm8,reg_or_imm8,rd mulsub is a UFU operation that uses the UFU 3-source format.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

ncldb, nclds, ncldw ncldb, nclds, and ncldw are memory access instructions that perform a non-cacheable load of an 8-bit byte, a 16-bit short, or a 32-bit word from address into the destination register $r[rd]$. The value loaded is sign-extended in the destination register. The use of an immediate for the second component of the address sets the $i$-bit of the opcode.

The effective address from which to load must be aligned to a natural boundary for the size of the load, but the consequences of failing to do that are not defined.

The suggested assembler syntax is:

```
ncldb   [address],rd
nclds   [address],rd
ncldw   [address],rd
``` ncld[b,s,w] instructions are SFU operations that use the SFU memory format.

ncldg ncldg is a memory access instruction that does an uncached load of a group of eight consecutive 32-bit words from address into eight consecutive registers beginning with the one specified by $r[rd]$. The use of an immediate for the second component of the address sets the $i$-bit of the opcode. $r[rd]$ must be 8-register aligned.

The effective address from which to load must be eight-word-aligned, but the consequences of failing to do that are not defined.

The suggested assembler syntax is:

```
ncldg   [address],rd
``` ncldg was formerly known as ldg. The assembler temporarily knows the former name as an alias for the new name to ease the transition.

Note that there is no complementary ncstg instruction.

ncldg is an SFU operation that use the SFU memory format.

ncldso, ncldwo ncldso and ncldwo are memory access instructions that perform a non-cacheable load of a 16-bit short or a 32-bit word from address into the destination register $r[rd]$ using the opposite endianness from that indicated by the *endian-bit* of %psr. The value loaded is sign-extended in the destination register. The use of an immediate for the second component of the address sets the $i$-bit of the opcode.

The effective address from which to load must be aligned to a natural boundary for the size of the load, but the consequences of failing to do that are not defined.
The suggested assembler syntax is:

```
ncldso  [address],rd
ncldwo  [address],rd
``` ncldso and ncldwo are SFU operations that use the SFU memory format.

ncldub, ncldus, nclduw ncldub, ncldus, and nclduw are memory access instructions that perform a non-cacheable load an unsigned 8-bit byte, an unsigned 16-bit short, or an unsigned 32-bit word from address into the destination register $r[rd]$. The use of an immediate for the second component of the address sets the $i$-bit of the opcode.

The effective address from which to load must be aligned to a natural boundary for the size of the load, but the consequences of failing to do that are not defined.

Note that while Café registers are 32-bits the behavior of nclduw and ncldw is identical, future extension is liable to to change that, so appropriate consideration should be used when choosing between these instructions.

The suggested assembler syntax is:

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

```
ncldub   [address],rd
ncldus   [address],rd
ncldus   [address],rd
``` ncldu[b,s,w] instructions are SFU operations that use the SFU memory format.

nclduso, nclduwo nclduso and nclduwo are memory access instructions that perform a non-cacheable load an unsigned 16-bit short or an unsigned 32-bit word from address into the destination register *r[rd]* using the opposite endianness from that indicated by the *endian-bit* of %psr. The use of an immediate for the second component of the address sets the *i-bit* of the opcode.

The effective address from which to load must be aligned to a natural boundary for the size of the load, but the consequences of failing to do that are not defined.

Note that while Café registers are 32-bits the behavior of nclduwo and ncldwo is identical, future extension is liable to to change that, so appropriate consideration should be used when choosing between these instructions.

The suggested assembler syntax is:

```
nclduso  [address],rd
nclduwo  [address],rd
``` nclduso and nclduwo are SFU operations that use the SFU memory format.

ncstb, ncsts, ncstw ncstb, ncsts, and ncstw are memory access instruction that perform a non-cacheable store an 8-bit byte, a 16-bit short, or a 32-bit word from the register specified by *r[rd]* to address. The use of an immediate for the second component of the address sets the *i-bit* of the opcode.

For ncsts and ncstw the effective address to which to store must be 2-byte aligned or 4-byte aligned, respectively, but the consequences of failing to do that are not defined.

The suggested assembler syntax is:

```
ncstb  rd,[address]
ncsts  rd,[address]
ncstw  rd,[address]
``` ncst[sb,s,w] are SFU operations that use the SFU memory format.

ncstso, ncstwo ncsts and ncstw are memory access instruction that perform a non-cacheable store of a 16-bit short or a 32-bit word from the register specified by *r[rd]* to address using the opposite endianness from that indicated by the *endian-bit* of %psr. The use of an immediate for the second component of the address sets the *i-bit* of the opcode.

For ncstso and ncstwo the effective address to which to store must be 2-byte aligned or 4-byte aligned, respectively, but the consequences of failing to do that are not defined.

The suggested assembler syntax is:

```
ncstso  rd,[address]
ncstwo  rd,[address]
``` ncstso and ncstwo are SFU operations that use the SFU memory format.

ncstpair ncstpair is a memory access instruction that performs an uncached store of a pair of adjacent registers beginning at the register specified by *r[rd]* to address. The use of an immediate for the second component of the address sets the *i-bit* of the opcode. *r[rd]* must be an even-numbered register.

The effective address to which to store must be even word-aligned, but the consequences of failing to do that are not defined.

The suggested assembler syntax is:

```
ncstpair  rd,[address]
```

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

ncstpair is an SFU operation that uses the SFU memory format.

nop nop is a control flow instruction that does nothing. It has the special property of being unique in its leading byte with its remaining bytes ignored.

The suggested assembler syntax is:

```
nop
``` nop is an SFU operation that uses the branch instruction format, but only the leading 6 bits of its opcode are significant and none of the other fields is used.

not not is a logical instruction that computes the bit-wise complement of $r[rs1]$, leaving the result is $r[rd]$.

The suggested assembler syntax is:

```
not     rs1,rd
```

The SFU version of not uses the SFU compute format, and the UFU version uses the UFU 2-source format. This instruction has no use for a second source operand; the assembler infers $r0$ in its place for purely neurotic reasons.

or or is a logical instruction that computes "$r[rs1] | r[rs2]$" or "$r[rs1] | imm14$". The use of an immediate for the second source operand sets the $i$-$bit$ of the opcode of the SFU version or the first header bit of the UFU version. The bit-wise logical result is left in $r[rd]$.

The suggested assembler syntax is:

```
or      rs1,reg_or_imm14,rd
```

The SFU version of or uses the SFU compute format, and the UFU version uses the UFU 2-source format.

pack pack is a pixel instruction that treats its first two source operands, $r[rs1]$ and $r[rs2]$, as two pair of unsigned 16-bit operands. Each 16-bit operand is shifted right by the the value of the the low-order 4 bits of the the third source operand, $r[rs3]$.

The low-order 8 bits of the resulting values are packed into the result resigter $r[rd]$, with the value derived from 31:16 of $r[rs1]$ in bits 31:24, the value derived from 15:0 of $r[rs1]$ in bits 23:16, the value derived from 31:16 of $r[rs2]$ in bits 15:8, and the value derived from 15:0 of $r[rs2]$ in bits 7:0.

The suggested assembler syntax is:

```
pack    rs1,rs2,rs3,rd
``` pack is a UFU operation that uses the UFU 3-source format.

padd, padds padd and padds are integer instructions that compute "$r[rs1] + r[rs2]$", where each of the sources is treated as a pair of independent 16-bit quantities yeilding a pair of independent 16-bit sums in $r[rd]$. padd also can have a 14-bit immediate as its second source operand, in which case the sign-extended immediate is added to each of 16-bit numbers in $r[rs1]$ and the two 16-bit sums are left in $r[rd]$.

padd produces ordinary two's-complement integer results, and padds produces saturated results.

The suggested assembler syntax is:

```
padd    rs1,reg_or_imm14,rd
padds   rs1,rs2,rd
``` padd and padds are UFU operations that use the UFU 2-source format.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

pcmovenz pcmovenz is an integer instruction that uses two 16-bit flags in $r[rs1]$ to control whether the corresponding 16-bit fields of $r[rs2]$ are copied to the same positions of $r[rd]$. A field of $r[rs2]$ is copied to $r[rd]$ is the corresponding flag field of $r[rs1]$ is non-zero. The flags in $r[rs1]$ will most likely be the result of a preceding pcmpeq or pcmplt.

The suggested assembler syntax is:

pcmovenz  rs1,rs2,rd pcmovenz is a UFU operation that uses the UFU 2-source format.

pcmovez pcmovez is an integer instruction that uses two 16-bit flags in $r[rs1]$ to control whether the corresponding 16-bit fields of $r[rs2]$ are copied to the same positions of $r[rd]$. A field of $r[rs2]$ is copied to $r[rd]$ is the corresponding flag field of $r[rs1]$ is zero. The flags in $r[rs1]$ will most likely be the result of a preceding pcmpeq or pcmplt.

The suggested assembler syntax is:

pcmovez  rs1,rs2,rd pcmovez is a UFU operation that uses the UFU 2-source format.

pcmpeq pcmpeq is an integer instruction that compares for equality the pair of shorts in its first source register with either a pair of shorts in its second source register or with a signed 14-bit immediate.

That is, when the second source operand is a register, the short in bits 31:16 of $r[rd]$ is set to one if "$r[rs1]<31:16> == r[rs2]<31:16>$" and zero otherwise, and the short in bits 15:0 of $r[rd]$ is set to one if "$r[rs1]<15:0> == r[rs2]<15:0>$" and zero otherwise. When the second source operand is an immediate, the short in bits 31:16 of $r[rd]$ is set to one if "$r[rs1]<31:16> == sign\_ext(imm14)$" and zero otherwise, and the short in bits 15:0 of $r[rd]$ is set to one if "$r[rs1]<15:0> == sign\_ext(imm14)$" and zero otherwise.

The suggested assembler syntax is:

pcmpeq  rs1,reg_or_imm14,rd pcmpeq is a UFU operation that uses the UFU 2-source format.

pcmplt pcmplt is an integer instruction that does a "compare less than" of pair of shorts in its first source register with either a pair of shorts in its second source register or with a signed 14-bit immediate.

That is, when the second source operand is a register,, the short in bits 31:16 of $r[rd]$ is set to one if "$r[rs1]<31:16> < r[rs2]<31:16>$" and zero otherwise, and the short in bits 15:0 of $r[rd]$ is set to one if "$r[rs1]<15:0> < r[rs2]<15:0>$" and zero otherwise. When the second source operand is an immediate, the short in bits 31:16 of $r[rd]$ is set to one if "$r[rs1]<31:16> < sign\_ext(imm14)$" and zero otherwise, and the short in bits 15:0 of $r[rd]$ is set to one if "$r[rs1]<15:0> < sign\_ext(imm14)$" and zero otherwise.

The suggested assembler syntax is:

pcmplt  rs1,reg_or_imm14,rd pcmplt is a UFU operation that uses the UFU 2-source format.

pdist pdist is a pixel instruction that treats each of its two source registers, $r[rs1]$ and $r[rs2]$, as four unsigned 8-bit values, subtracts the corresponding pairs, and adds the sum of the absolute values of those differences to the value in the register specified by $r[rd]$.

The suggested assembler syntax is:

pdist  rs1,rs2,rd

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

pdist is a UFU operation that uses the UFU 2-source format.

--- pmean pmean is a pixel instruction that treats its source operands *r[rs1]* and *r[rs2]* as pairs of unsigned 16-bit integers and computes a pair of mean values in *r[rd]*. These means are rounded high according to the formula: "*r[rd]<15:0> = (r[rs1]<15:0> + r[rs2]<15:0> + 1) >> 1*" and likewise for the other halves.

The suggested assembler syntax is:

pmean    rs1,rs2,rd pmean is a UFU operation that uses the UFU 2-source format.

--- pmul pmul is an integer instruction that multiplies the pair of 16-bit operands in *r[rs1]* with either a a pair of 16-bit operands in *r[rs2]* or with a sign-extended 14-bit immediate, placing a pair of independent 16-bit products in *r[rd]*.

That is, when the second source operand is a register, bits 31:16 of *r[rd]* are set to the product bits 31:16 of *r[rs1]* and bits 31:16 of *r[rs2]* and bits 15:0 of *r[rd]* are set to the product bits 15:0 of *r[rs1]* and bits 15:0 of *r[rs2]*. When the second source operand is an immediate, bits 31:16 of *r[rd]* are set to the product bits 31:16 of *r[rs1]* and *sign_ext(imm14)* and bits 15:0 of *r[rd]* are set to the product bits 15:0 of *r[rs1]* and *sign_ext(imm14)*.

The format of the operands and results is indicated by the saturation field of the Processor Status Register, but this operation does not saturate.

The suggested assembler syntax is:

pmul    rs1,reg_or_imm14,rd pmul is a UFU operation that uses the UFU 2-source format.

--- pmuladd, pmuladds pmuladd and pmuladd are integer instructions that compute "*(r[rs1] \* r[rs2]) + r[s3]*", where each of the sources is treated as a pair of independent 16-bit quantities yeilding a pair of independent 16-bit results in *r[rd]*. The format of the operands and results is indicated by the saturation field of the Processor Status Register, but pmuladd does not saturate and pmuladds does.

The suggested assembler syntax is:

pmuladd    rs1,rs2,rs3,rd
    pmuladds  rs1,rs2,rs3,rd pmuladd and pmuladd are UFU operations that use the UFU 3-source format.

--- pmulsub, pmulsubs pmulsub and pmulsub are integer instructions that compute "*(r[rs1] \* r[rs2]) - r[s3]*", where each of the sources is treated as a pair of independent 16-bit quantities yeilding a pair of independent 16-bit results in *r[rd]*. The format of the operands and results is indicated by the saturation field of the Processor Status Register, but pmulsub does not saturate and pmulsubs does.

The suggested assembler syntax is:

pmulsub    rs1,rs2,rs3,rd
    pmulsubs  rs1,rs2,rs3,rd pmulsub and pmulsubs are UFU operations that use the UFU 3-source format.

--- ppower ppower is an fixed-point instruction that computes "*r[rs1] \*\* r[rs2]*", where each of the sources is treated as a pair of independent 16-bit quantities yeilding a pair of independent 16-bit powers in *r[rd]*.

By stipulation, zero to any power is zero.

UNITED STATES PATENT AND TRADEMARK OFFICE
CERTIFICATE OF CORRECTION

PATENT NO.    : 6,718,457 B2
DATED         : April 6, 2004
INVENTOR(S)   : Tremblay et al.

It is certified that error appears in the above-identified patent and that said Letters Patent is hereby corrected as shown below:

The suggested assembler syntax is:

```
ppower  rs1,rs2,rd
``` ppower is a SFU operation that uses the SFU compute format.

--- precsqrt precsqrt is a fixed-point instruction that computes a pair of fixed-point reciprocal square roots of the 16-bit values on r[rs1]. The results are delivered in r[rd].

The suggested assembler syntax is:

```
precsqrt  rs1,rd
``` precsqrt is a SFU operation that uses the SFU compute format. The second source operand for the format is unused by this instruction.

--- pshll pshll is a logical instruction that shifts each of the the pair of 16-bit operands in r[rs1] left by either the lower-order 4 bits of the corresponding half of r[rs2] or the low-order 4 bits of its immediate. The shifted results are left in r[rd].

The suggested assembler syntax is:

```
pshll  rs1,reg_or_imm14,rd
``` pshll is a UFU operation that uses the UFU 2-source format.

--- pshra pshra is a logical instruction that performs a right arithmetic shift of the pair of 16-bit operands in r[rs1]. The shift count of each is either the low-order 4 bits of the corresponding half of r[rs2] or the low-order 4 bits of its immediate. The shifted results are left in r[rd].

The suggested assembler syntax is:

```
pshra  rs1,reg_or_imm14,rd
``` pshra is a UFU operation that uses the UFU 2-source format.

--- pshrl pshrl is a logical instruction that performs a right logical shift of the pair of 16-bit operands in r[rs1]. The shift count of each is either the low-order 4 bits of the corresponding half of r[rs2] or the low-order 4 bits of its immediate. The shifted results are left in r[rd].

The suggested assembler syntax is:

```
pshrl  rs1,reg_or_imm14,rd
``` pshrl is a UFU operation that uses the UFU 2-source format.

--- psub, psubs psub and psubs are integer instructions that compute "r[rs1] - r[rs2]", where each of the sources is treated as a pair of independent 16-bit quantities yielding a pair of independent 16-bit differences in r[rd]. psub also can have a 14-bit immediate as its second source operand, in which case the sign-extended immediate is subtracted from each of 16-bit numbers in r[rs1] and the two 16-bit differences are left in r[rd].

psub produces ordinary two's-complement integer results, and psubs produces saturated results.

The suggested assembler syntax is:

```
psub    rs1,reg_or_imm14,rd
psubs   rs1,rs2,rd
``` psub and psubs are UFU operations that use the UFU 2-source format.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

rem rem is an integer instruction that computes "r[rs1] % r[rs2]" or "r[rs1] % sign_ext(imm14)". The use of an immediate for the second source operand sets the *i-bit* of the opcode. The result is left in *r[rd]*.

If the second source operand is zero, rem will trap.

The suggested assembler syntax is:

```
rem     rs1,reg_or_imm14,rd
``` rem is an SFU operation that uses the SFU compute format.

retry retry is a control flow instruction causes a control transfer from a trap handler to the instruction word that caused the trap. Please refer to the Traps chapter of the Café Microarchitecture specification for the complete description.

The suggested assembler syntax is:

```
retry
``` retry is a SFU operation that uses the SFU compute format, but it has no use for any operand.

return return is a control flow instruction that causes a register-indirect control transfer to the address in "r[rs1]".

The suggested assembler syntax is:

```
return  rs1
``` return is a pseudo-op. What it really means is "*jmpl r[rs1]+0,r0*".

s2ib, s2is, s2iw

Note: s2is and s2iw might be removed. This section will be rewritten when the matter is settled.

s2ib, s2is, and s2iw are memory access instruction that store an 8-bit byte, a 16-bit short, or a 32-bit word from the register specified by *r[rd]* to address. The use of an immediate for the second component of the address sets the *i-bit* of the opcode. The intent is that these are the instructions to be used to modify code on the fly, so these stores guarantee instruction cache consistency.

For s2is and s2iw the effective address to which to store must be 2-byte aligned or 4-byte aligned, respectively, but the consequences of failing to do that are not defined. Because of this alignment requirement and the fact that Café instructions can be at any byte boundary, care must be taken in choosing the right instruction.

The suggested assembler syntax is:

```
s2ib    rd,[address]
s2is    rd,[address]
s2iw    rd,[address]
``` s2i[sb,s,w] are SFU operations that use the SFU memory format.

sethi sethi is an integer instruction that places its immediate operand in the high-order 22 bits of *r[rd]* and clears the low-order 10 bits. It is frequently used with the %hi operator to form base addresses for subsequent memory references.

The suggested assembler syntax is:

```
sethi   imm22,rd
sethi   %hi(label),rd
``` sethi is an SFU operation that uses a format of its own.

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

setir setir is an integer instruction that sets the internal register the ordinal of which is its *r[rd]* operand to the value in its *r[rs1]* operand.

The suggested assembler syntax is:

```
setir    rs1,rd
``` setir is an SFU operation that uses the SFU compute format in an irregular way. It has no use for the second source operand, and the destination register is an internal register number, NOT one of the general purpose registers.

shll shll is a logical instruction that computes "*r[rs1]* << *r[rs2]*" or "*r[rs1]* << *imm*". The use of an immediate for the second source operand sets the *i-bit* of the opcode of the SFU version or the first header bit of the UFU version. The result is left in *r[rd]*. Only the low-order 5 bits of the second source operand are used.

The suggested assembler syntax is:

```
shll     rs1,reg_or_imm,rd
```

The SFU version of shll uses the SFU compute format, and the UFU version uses the UFU 2-source format.

shra shra is a logical instruction that computes "*r[rs1]* >> *r[rs2]*" or "*r[rs1]* >> *imm*". The use of an immediate for the second source operand sets the *i-bit* of the opcode of the SFU version or the first header bit of the UFU version. The result is left in *r[rd]*. The first source operand is treated as a signed integer, so the result is sign-extended. Only the low-order 5 bits of the second source operand are used.

The suggested assembler syntax is:

```
shra     rs1,reg_or_imm,rd
```

The SFU version of shra uses the SFU compute format, and the UFU version uses the UFU 2-source format.

shrl shrl is a logical instruction that computes "*r[rs1]* >> *r[rs2]*" or "*r[rs1]* >> *imm*". The use of an immediate for the second source operand sets the *i-bit* of the opcode of the SFU version or the first header bit of the UFU version. The result is left in *r[rd]*. The first source operand is treated as an unsigned integer, so the result is not sign-extended. Only the low-order 5 bits of the second source operand are used.

The suggested assembler syntax is:

```
shrl     rs1,reg_or_imm,rd
```

The SFU version of shrl uses the SFU compute format, and the UFU version uses the UFU 2-source format.

sir sir is a control flow instruction that resets the machine. sir is a privileged instruction; executing it when the Supervisor Mode flag of %psr is clear causes a privileged instruction trap.

The suggested assembler syntax is:

```
sir
``` sir is an SFU operation that uses the SFU compute format, but has no use for any of that format's operands.

softtrap

UNITED STATES PATENT AND TRADEMARK OFFICE
CERTIFICATE OF CORRECTION

PATENT NO. : 6,718,457 B2
DATED : April 6, 2004
INVENTOR(S) : Tremblay et al.

It is certified that error appears in the above-identified patent and that said Letters Patent is hereby corrected as shown below:

softtrap is a control flow instruction that generates a trap. The ordinal of the trap is specified by $r[rs1]$ - $r[rs2]$ or $r[rs1]$ - $sign\_ext(imm14)$. For details on how traps work, see the Traps chapter of the Café Microarchitecture specification.

The suggested assembler syntax is:

```
softtrap  rs1,reg_or_imm14
``` softtrap is an SFU operation that uses the SFU compute format but has no use for the destination register field of that format.

stb, sts, stw stb, sts, and stw are memory access instruction that store an 8-bit byte, a 16-bit short, or a 32-bit word from the register specified by $r[rd]$ to address. The use of an immediate for the second component of the address sets the *i-bit* of the opcode.

For sts and stw the effective address to which to store must be 2-byte aligned or 4-byte aligned, respectively, but the consequences of failing to do that are not defined.

The suggested assembler syntax is:

```
stb     rd, [address]
sts     rd, [address]
stw     rd, [address]
``` st[sb,s,w] are SFU operations that use the SFU memory format.

stg stg would be the mnemonic for a *store group* instruction if the were one, but there is not. Most careful readers notice this asymmetry and ask whether it is an oversight, so this note hopes to explain and forestall that question.

Since the register file read port can deliver no more than 64 bits per cycle, a store of a group would induce a 3-cycle stall. Doing the stores with four stpair instructions would make better use of the issue bandwidth because that would allow work to proceed on the other units.

stso, stwo sts and stw are memory access instruction that store a 16-bit short or a 32-bit word from the register specified by $r[rd]$ to address using the opposite endianness from that indicated by the *endian-bit* of tpsr. The use of an immediate for the second component of the address sets the *i-bit* of the opcode.

For stso and stwo the effective address to which to store must be 2-byte aligned or 4-byte aligned, respectively, but the consequences of failing to do that are not defined.

The suggested assembler syntax is:

```
stso    rd, [address]
stwo    rd, [address]
``` stso and stwo are SFU operations that use the SFU memory format.

stpair stpair is a memory access instruction that performs a store of a pair of adjacent registers beginning at the register specified by $r[rd]$ to address. The use of an immediate for the second component of the address sets the *i-bit* of the opcode. $r[rd]$ must be an even-numbered register.

The effective address to which to store must be even word-aligned, but the consequences of failing to do that are not defined.

The suggested assembler syntax is:

```
stpair  rd, [address]
``` stpair is an SFU operation that uses the SFU memory format.

UNITED STATES PATENT AND TRADEMARK OFFICE
CERTIFICATE OF CORRECTION

PATENT NO.    : 6,718,457 B2
DATED         : April 6, 2004
INVENTOR(S)   : Tremblay et al.

It is certified that error appears in the above-identified patent and that said Letters Patent is hereby corrected as shown below:

sub sub is an integer instruction that computes $r[rs1] - r[rs2]$ or $r[rs1] - sign\_ext(imm14)$. The use of an immediate for the second source operand sets the $i$-bit of the opcode of the SFU version or the first header bit of the UFU version. The result is left in $r[rd]$.

The suggested assembler syntax is:

sub    rs1,reg_or_imm14,rd

The SFU version of sub uses the SFU compute format, and the UFU version uses the UFU 2-source format.

xor xor is a logical instruction that computes "$r[rs1]$ ^ $r[rs2]$" or "$r[rs1]$ ^ $imm14$". The use of an immediate for the second source operand sets the $i$-bit of the opcode of the SFU version or the first header bit of the UFU version. The bit-wise logical result is left in $r[rd]$.

The suggested assembler syntax is:

xor    rs1,reg_or_imm14,rd

The SFU version of xor uses the SFU compute format, and the UFU version uses the UFU 2-source format.

Signed and Sealed this

Fourteenth Day of September, 2004

JON W. DUDAS
*Director of the United States Patent and Trademark Office*